United States Patent
Sakaino et al.

(10) Patent No.: US 11,003,312 B2
(45) Date of Patent: May 11, 2021

(54) NON-TRANSITORY COMPUTER-READABLE STORAGE MEDIUM WITH EXECUTABLE PROGRAM STORED THEREON, INFORMATION PROCESSING APPARATUS, INFORMATION PROCESSING METHOD, AND INFORMATION PROCESSING

(71) Applicant: NINTENDO CO., LTD., Kyoto (JP)

(72) Inventors: Masamichi Sakaino, Kyoto (JP); Naoya Morimura, Kyoto (JP); Yasuhiko Matsuzaki, Kyoto (JP); Minori Koike, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 16/167,767

(22) Filed: Oct. 23, 2018

(65) Prior Publication Data
US 2020/0034023 A1 Jan. 30, 2020

(30) Foreign Application Priority Data

Jul. 27, 2018 (JP) .............................. JP2018-141769

(51) Int. Cl.
*G06F 3/0481* (2013.01)
*G06F 3/0482* (2013.01)
*G06F 3/0484* (2013.01)

(52) U.S. Cl.
CPC ........ *G06F 3/04817* (2013.01); *G06F 3/0482* (2013.01); *G06F 3/04845* (2013.01)

(58) Field of Classification Search
CPC . G06F 3/04817; G06F 3/0482; G06F 3/04845
See application file for complete search history.

(56) References Cited

U.S. PATENT DOCUMENTS

| 5,333,256 A | * | 7/1994 | Green | G06F 3/04817 715/772 |
| 6,426,761 B1 | * | 7/2002 | Kanevsky | G06F 3/0481 715/764 |
| 7,113,628 B1 | * | 9/2006 | Obara | G06T 7/001 356/237.1 |

(Continued)

FOREIGN PATENT DOCUMENTS

| CN | 104867103 | 8/2015 |
| JP | 2012-58979 | 3/2012 |

(Continued)

OTHER PUBLICATIONS

Japanese Office Action and its English translation for Japanese Application No. 2018-141769, eight pages, dated Dec. 28, 2020.

*Primary Examiner* — Shourjo Dasgupta
(74) *Attorney, Agent, or Firm* — Nixon & Vanderhye P C.

(57) ABSTRACT

A program causes a computer to perform determining a display size for each icon image by scaling each icon image with a length-to-width ratio thereof being maintained such that icon images associated with each row are equal in display height in each row in a menu region and by scaling the icon images as a whole associated with each row at an identical ratio such that a width of the row as a whole obtained by scaling each icon image associated with each row is set to a prescribed length, and showing the menu image in which icons of which icon images are shown with corresponding sizes are arranged for each row.

20 Claims, 22 Drawing Sheets

(56) References Cited

U.S. PATENT DOCUMENTS

| | | | |
|---|---|---|---|
| 7,860,367 B2* | 12/2010 | Shimizu | G11B 27/002 386/239 |
| 8,077,187 B2* | 12/2011 | Bezryadin | G09G 5/005 345/619 |
| 9,116,648 B1* | 8/2015 | Funderburg | G06F 3/1242 |
| 9,684,436 B2* | 6/2017 | Ording | G06F 3/04842 |
| 10,228,844 B2* | 3/2019 | Ibaraki | G06F 3/04883 |
| 2004/0090470 A1* | 5/2004 | Kim | G06F 3/0481 715/846 |
| 2005/0216862 A1* | 9/2005 | Shinohara | H04N 5/23293 715/825 |
| 2006/0250834 A1* | 11/2006 | Chinn | G06F 3/0482 365/63 |
| 2007/0230828 A1* | 10/2007 | Ignatchenko | H04N 1/3876 382/298 |
| 2010/0107150 A1 | 4/2010 | Kamada et al. | |
| 2011/0060988 A1* | 3/2011 | Mysliwy | G06F 3/04817 715/702 |
| 2011/0145764 A1* | 6/2011 | Higuchi | G06F 3/0482 715/835 |
| 2012/0054649 A1 | 3/2012 | McDonald et al. | |
| 2013/0106913 A1 | 5/2013 | Edmiston et al. | |
| 2014/0157329 A1* | 6/2014 | Roberts | H04L 67/10 725/61 |
| 2015/0169146 A1* | 6/2015 | Lalwani | G06F 3/0482 715/811 |
| 2015/0370456 A1* | 12/2015 | Kobayashi | A63F 13/23 463/33 |
| 2016/0018970 A1* | 1/2016 | Chaudhri | G06F 3/04815 715/815 |
| 2016/0127652 A1* | 5/2016 | Park | H04N 5/232 715/835 |
| 2016/0266703 A1 | 9/2016 | Sugimoto et al. | |
| 2016/0370982 A1* | 12/2016 | Penha | G06F 3/04847 |
| 2017/0235537 A1* | 8/2017 | Liu | G06F 3/1454 715/759 |
| 2017/0308275 A1 | 10/2017 | Sowden et al. | |
| 2018/0018077 A1 | 1/2018 | Yamane et al. | |
| 2018/0189069 A1* | 7/2018 | Huang | G06F 3/04817 |
| 2018/0321825 A1* | 11/2018 | Martineli | G06F 3/0483 |
| 2019/0149887 A1* | 5/2019 | Williams | H04N 21/4312 725/52 |

FOREIGN PATENT DOCUMENTS

| | | | |
|---|---|---|---|
| JP | 2016-504644 | 2/2016 | |
| JP | 2016-170674 | 9/2016 | |
| JP | 2018-010427 | 1/2018 | |
| WO | WO-2004063905 A2 * | 7/2004 | G06F 3/04817 |
| WO | 2008/114491 | 9/2008 | |

* cited by examiner

NON-TRANSITORY COMPUTER-READABLE STORAGE MEDIUM WITH EXECUTABLE PROGRAM STORED THEREON, INFORMATION PROCESSING APPARATUS, INFORMATION PROCESSING METHOD, AND INFORMATION PROCESSING

This nonprovisional application is based on Japanese Patent Application No. 2018-141769 filed with the Japan Patent Office on Jul. 27, 2018, the entire contents of which are hereby incorporated by reference.

FIELD

The present disclosure relates to a technique for showing a menu image including an icon.

BACKGROUND AND SUMMARY

An information processing apparatus on which a plurality of applications are available has been known. In such an information processing apparatus, a menu image for selecting an application to be executed from among a plurality of applications is often provided. Typically, a menu image showing icons representing respective applications in a list is provided. In such a menu image, an order of alignment and a size of shown icons can arbitrarily be changed in response to an instruction from a user.

An icon shown in a normal menu image is created in a predetermined image size. The background art has not studied representation of icon images not identical in image size in a menu image.

An exemplary embodiment provides a configuration allowing appropriate adjustment of a display size or a layout of icons associated with applications in response to an instruction from a user even though icon images used for showing the icons are not equal in display size to one another in showing a menu image including the icons.

An exemplary embodiment provides a program executed by a computer of an information processing apparatus. The program causes the computer to perform setting an order of arrangement of a plurality of icon images for each row in a menu region, wherein the plurality of icon images may include icon images not identical in image size and each of the icon images is associated with an application, changing arrangement of the plurality of icon images in response to an input instruction, determining a display size of each icon image by varying a size of each icon image with a length-to-width ratio thereof being maintained such that the icon images included in a row are identical in display height in each row in the menu region and varying a size of the icon images as a whole included in the row at an identical ratio such that a width of the row as a whole is set to a prescribed length, generating a menu image in which each icon image is arranged in the determined display size for each row, and starting, in response to an instruction onto any icon, execution of an application associated with the instructed icon.

According to the configuration, the order of icon images in the menu region can arbitrarily be varied in response to an input instruction, and a menu image including icons of which display size has been adjusted in accordance with the varied order of icon images can be provided.

The changing arrangement may include processing for inserting a selected icon in any position in any row. According to the configuration, a user can insert a selected icon in any position in any row in accordance with his/her preference. Since sizes of the icon images are varied in accordance with the number of icon images included in a row, the user can designate not only a position of an icon image but also a size thereof in accordance with his/her preference.

The selected icon may be shown with an icon image having a display size relatively greater than before selection. According to the configuration, the user can readily recognize that the selected icon can be inserted in any position.

The changing arrangement may include processing for sorting the plurality of icon images under a prescribed rule. According to the configuration, the user can not only arbitrarily set an order of arrangement of icons but also sort icons under a prescribed rule.

The application may include a game program. According to the configuration, when a number of game programs are provided, the user can generate a menu image in accordance with his/her preference.

The icon image may include a package image of a game program sold in the past. According to the configuration, the user can readily know, by looking at an icon representing a package image, with which application that icon is associated.

The plurality of icon images include a first icon image associated with start of a first application from a first state and a second icon image associated with start of the first application from a second state different from the first state. According to the configuration, even the same application can provide a user with a plurality of ways of having fun.

Start from the second state may be realized by reading and execution by the first application of setting information defining the second state. According to the configuration, the application itself can be common. Therefore, even when the same application is started from a plurality of states, applications corresponding to respective states do not have to be stored and hence undue increase in data capacity can be avoided.

The program may further cause the computer to perform outputting layout information including information on an order of the plurality of icon images and a display size of each icon image and sharing the layout information with other information processing apparatuses during online play. According to the configuration, since the layout information is used, a data capacity can be lower and processing can be faster than in a configuration in which a menu image itself is held. Since the layout information is used, processing for sharing a menu image among a plurality of information processing apparatuses can readily be realized.

The program may further cause the computer to perform showing detailed information on an application associated with a selected icon in response to an input instruction. According to the configuration, the user can know, before start of execution of an application, detailed information on the application.

The program may further cause the computer to perform showing a prescribed icon of an application satisfying a prescribed condition, rather than an icon shown with an icon image associated with the application. According to the configuration, during a period until an icon associated with an application is shown, a user can be given such expectations as what the application is like.

Another exemplary embodiment provides a program executed by a computer of an information processing apparatus. The program causes the computer to perform setting an order of arrangement of a plurality of icon images for each column in a menu region, wherein the plurality of icon images may include icon images not identical in image size and each of the icon images is associated with an application, changing arrangement of the plurality of icon images in response to an input instruction, determining a display size of each icon image by varying a size of each icon image with a length-to-width ratio thereof being maintained such that the icon images included in a column are identical in display height in each column in the menu region and varying a size of the icon images as a whole included in the column at an identical ratio such that a width of the column as a whole is set to a prescribed length, generating a menu image in which each icon image is arranged in the determined display size for each column, and starting, in response to an instruction onto any icon, execution of an application associated with the instructed icon.

According to the configuration, the order of icon images in the menu region can arbitrarily be varied in response to an input instruction, and a menu image including icons of which display size has been adjusted in accordance with the varied order of icon images can be provided.

Another exemplary embodiment provides an information processing apparatus that includes an arrangement module configured to set an order of arrangement of a plurality of icon images for each row in a menu region, wherein the plurality of icon images may include icon images not identical in image size and each of the icon images is associated with an application, an arrangement changing module configured to change arrangement of the plurality of icon images in response to an input instruction, a size adjustment module configured to determine a display size of each icon image by varying a size of each icon image with a length-to-width ratio thereof being maintained such that the icon images included in a row are identical in display height in each row in the menu region and varying a size of the icon images as a whole included in the row at an identical ratio such that a width of the row as a whole is set to a prescribed length, an image generation module configured to generate a menu image in which each icon image is arranged in the display size determined by the size adjustment module for each row, and an application start module configured to start, in response to an instruction onto any icon, execution of an application associated with the instructed icon.

According to the configuration, the order of icon images in the menu region can arbitrarily be varied in response to an input instruction, and a menu image including icons of which display size has been adjusted in accordance with the varied order of icon images can be provided.

The arrangement changing module may perform processing for inserting a selected icon in any position in any row. According to the configuration, a user can insert a selected icon in any position in any row in accordance with his/her preference.

The selected icon may be shown with an icon image having a display size relatively greater than before selection. According to the configuration, the user can readily recognize that the selected icon can be inserted in any position.

Another exemplary embodiment provides an information processing method that includes setting an order of arrangement of a plurality of icon images for each row in a menu region, wherein the plurality of icon images may include icon images not identical in image size and each of the icon images is associated with an application, changing arrangement of the plurality of icon images in response to an input instruction, determining a display size of each icon image by varying a size of each icon image with a length-to-width ratio thereof being maintained such that the icon images included in a row are identical in display height in each row in the menu region and varying a size of the icon images as a whole included in the row at an identical ratio such that a width of the row as a whole is set to a prescribed length, generating a menu image in which each icon image is arranged in the determined display size for each row, and starting, in response to an instruction onto any icon, execution of an application associated with the instructed icon.

According to the configuration, the order of icon images in the menu region can arbitrarily be varied in response to an input instruction, and a menu image including icons of which display size has been adjusted in accordance with the varied order of icon images can be provided.

The changing arrangement may include processing for inserting a selected icon in any position in any row. According to the configuration, a user can insert a selected icon in any position in any row in accordance with his/her preference.

The selected icon may be shown with an icon image having a display size relatively greater than before selection. According to the configuration, the user can readily recognize that the selected icon can be inserted in any position.

Another exemplary embodiment provides an information processing system that includes a display device and an information processing device. The information processing device is configured to perform setting an order of arrangement of a plurality of icon images for each row in a menu region, wherein the plurality of icon images may include icon images not identical in image size and each of the icon images is associated with an application, changing arrangement of the plurality of icon images in response to an input instruction, determining a display size of each icon image by varying a size of each icon image with a length-to-width ratio thereof being maintained such that the icon images included in a row are identical in display height in each row in the menu region and varying a size of the icon images as a whole included in the row at an identical ratio such that a width of the row as a whole is set to a prescribed length, generating a menu image in which each icon image is arranged in the determined display size for each row, and starting, in response to an instruction onto any icon, execution of an application associated with the instructed icon.

According to the configuration, the order of icon images in the menu region can arbitrarily be varied in response to an input instruction, and a menu image including icons of which display size has been adjusted in accordance with the varied order of icon images can be provided.

The changing arrangement may include processing for inserting a selected icon in any position in any row. According to the configuration, a user can insert a selected icon in any position in any row in accordance with his/her preference.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
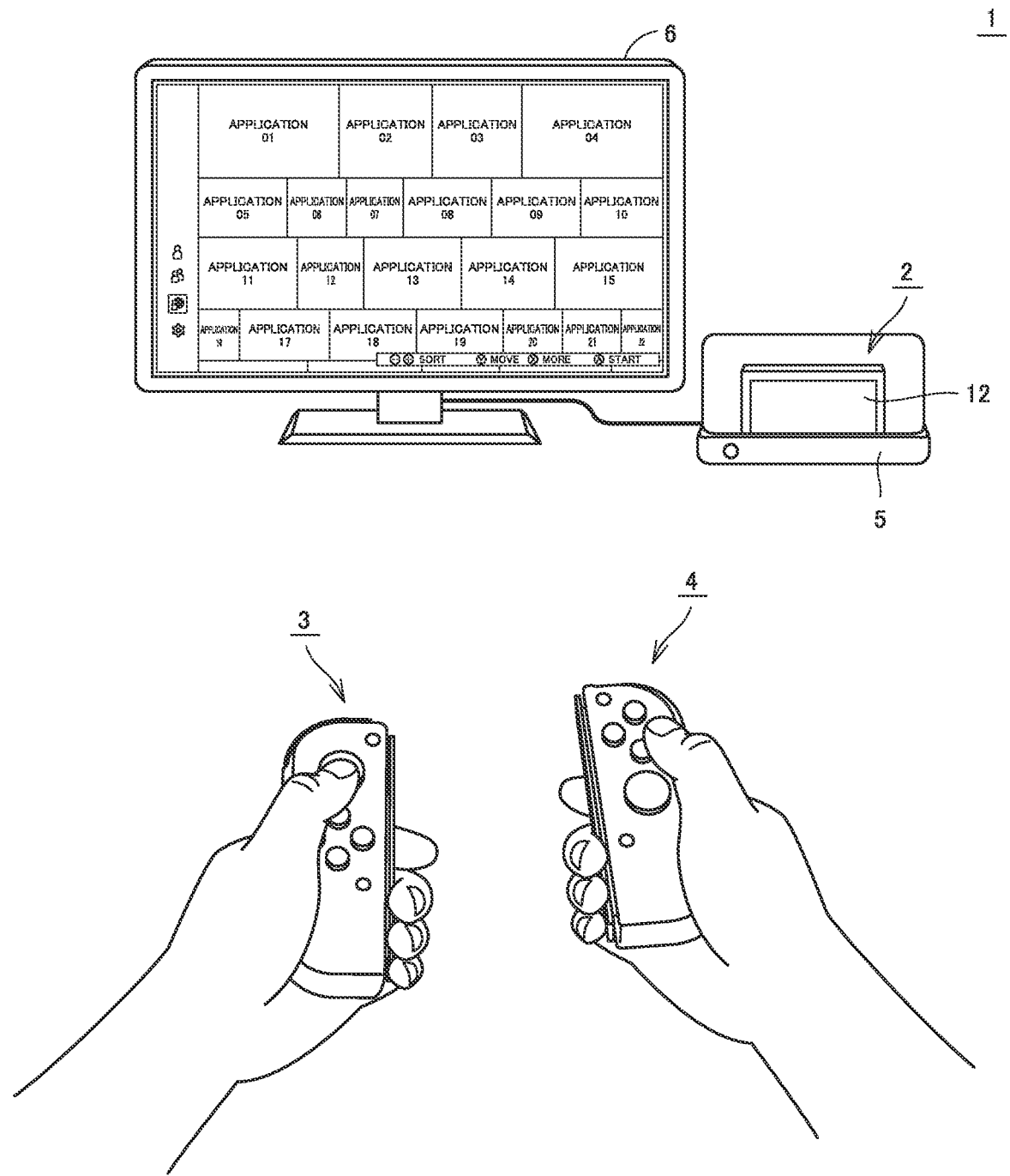
FIG. 1 shows an exemplary illustrative non-limiting drawing illustrating one example of appearance of an information processing system according to the present embodiment.

The present embodiment will be described in detail with reference to the drawings. The same or corresponding elements in the drawings have the same reference characters allotted and description thereof will not be repeated.

[A. Information Processing System]

An information processing system 1 according to the present embodiment will initially be outlined.

(a1: Appearance of Information Processing System 1)

One example of appearance of information processing system 1 according to the present embodiment will be described with reference to FIG. 1. Information processing system 1 includes a main body apparatus 2 representing one example of an information processing apparatus and a left controller 3 and a right controller 4 representing one example of an input device. Main body apparatus 2 may include a display 12 (a display device).

Information processing system 1 may further include a display apparatus 6 (a display device) configured to output video pictures and voice and sound generated as a result of processing in main body apparatus 2. In a manner of use shown in FIG. 1, main body apparatus 2 is placed on a cradle 5 and main body apparatus 2 and display apparatus 6 are electrically connected to each other through cradle 5. Cradle 5 may have a function to charge main body apparatus 2 placed thereon and a communication hub (for example, a USB hub) function which mediates communication between main body apparatus 2 and another information processing apparatus.

(a1: Internal Configuration of Main Body Apparatus 2)

Figure 2:
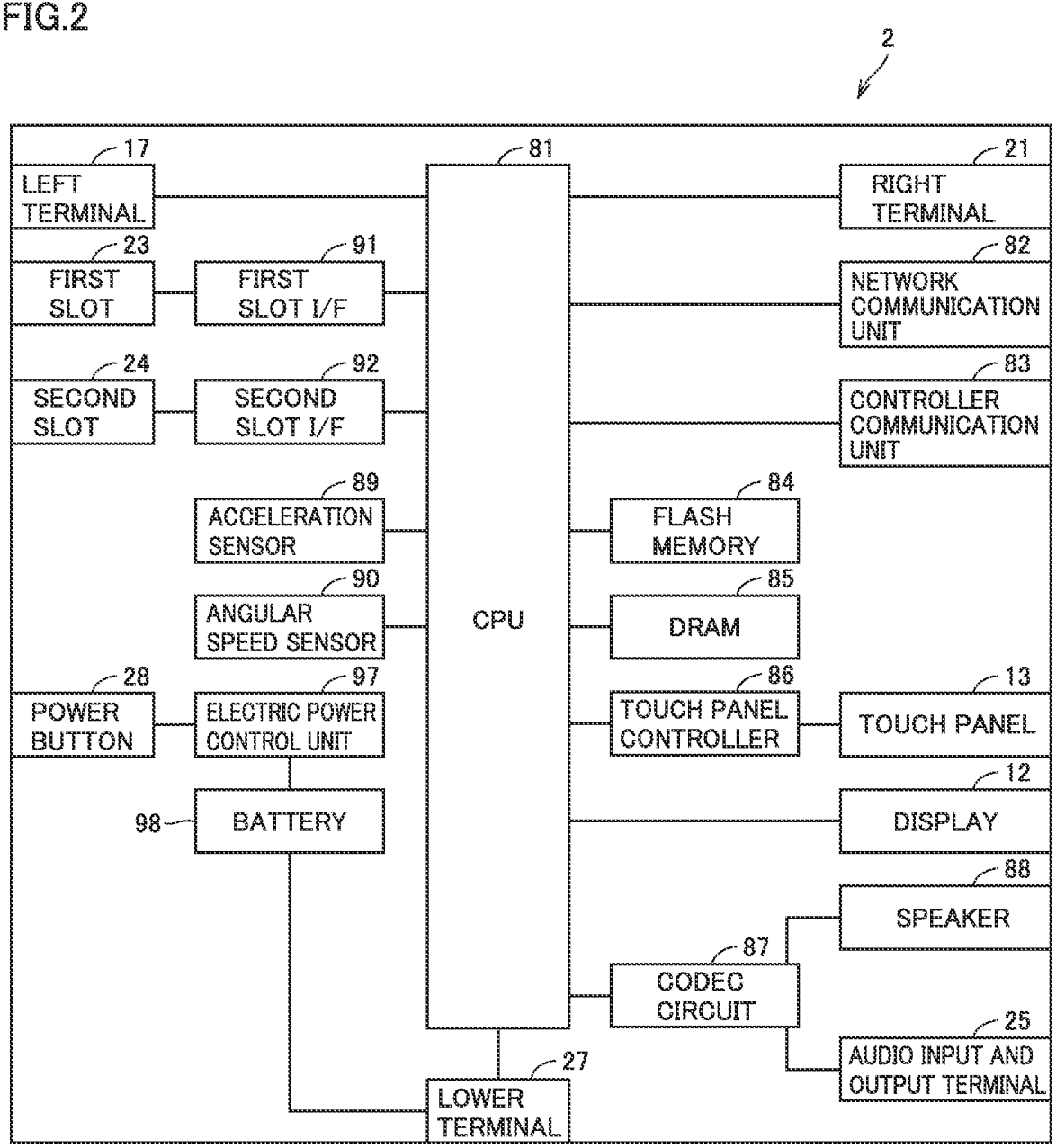
FIG. 2 shows an exemplary illustrative non-limiting drawing illustrating one example of an internal configuration of a main body apparatus constituting the information processing system according to the present embodiment.

One example of an internal configuration of main body apparatus 2 constituting information processing system 1 according to the present embodiment will be described with reference to FIG. 2. Main body apparatus 2 includes a central processing unit (CPU) 81 representing one example of a processor performing various types of processing.

Main body apparatus 2 includes a flash memory 84 and a dynamic random access memory (DRAM) 85 by way of example of an internal storage medium. Flash memory 84 mainly stores in a non-volatile manner, various types of data (including a program) to be used in main body apparatus 2. DRAM 85 temporarily stores data used in execution of a program by CPU 81.

Main body apparatus 2 includes a first slot 23 to which an external storage medium of a first type (for example, an SD card) is attached and a second slot 24 to which an external storage medium of a second type (for example, a dedicated memory card) is attached. A first slot interface (I/F) 91 connected to first slot 23 reads and writes data from and into an external storage medium of the first type attached to first slot 23, in response to an instruction from CPU 81. A second slot interface 92 connected to second slot 24 reads and writes data from and into an external storage medium of the second type attached to second slot 24, in response to an instruction from CPU 81.

Main body apparatus 2 includes a network communication unit 82 for communication (specifically, wireless communication) with an external apparatus through a network. For example, network communication unit 82 communicates with another information processing apparatus or a server through wireless LAN or a mobile communication network (that is, a portable telephone communication network).

Main body apparatus 2 includes a controller communication unit 83 for wireless communication with left controller 3 and/or right controller 4.

CPU 81 communicates with various apparatuses connected to main body apparatus 2 through a left terminal 17, a right terminal 21, and a lower terminal 27. CPU 81 transmits and receives data to and from left controller 3 through left terminal 17 when left controller 3 is attached to main body apparatus 2. CPU 81 transmits and receives data to and from right controller 4 through right terminal 21 when right controller 4 is attached to main body apparatus 2. CPU 81 transmits and receives data to and from cradle 5 through lower terminal 27 when main body apparatus 2 is placed on cradle 5.

Main body apparatus 2 includes a display 12 and a touch panel 13. Display 12 shows an image generated by CPU 81 and/or an externally obtained image. Main body apparatus 2 includes a touch panel controller 86 for control of touch panel 13. Touch panel controller 86 generates data indicating a position of a touch input in response to a signal from touch panel 13, and outputs the data to CPU 81.

Main body apparatus 2 includes a codec circuit 87 and a speaker 88 (specifically, a left speaker and a right speaker). Codec circuit 87 controls input and output of audio data to and from speaker 88 and an audio input and output terminal 25.

Main body apparatus 2 has an acceleration sensor 89 and an angular speed sensor 90. Acceleration sensor 89 detects magnitude of a linear acceleration along directions of prescribed three axes (for example, xyz axes shown in FIG. 1). Angular speed sensor 90 detects angular speeds around prescribed three axes (for example, the xyz axes shown in FIG. 1).

Main body apparatus 2 includes an electric power control unit 97 and a battery 98. Electric power control unit 97 controls supply of electric power from battery 98 to each component based on a command from CPU 81. When an operation to turn off power supply is performed on a power button 28, electric power control unit 97 stops supply of electric power totally or in part, and when an operation to turn on power supply is performed on power button 28, it starts full supply of electric power.

When main body apparatus 2 is placed on cradle 5 and electric power is supplied to main body apparatus 2 through lower terminal 27, battery 98 is charged with supplied electric power.

(a3: Internal Configuration of Controller)

Figure 3:
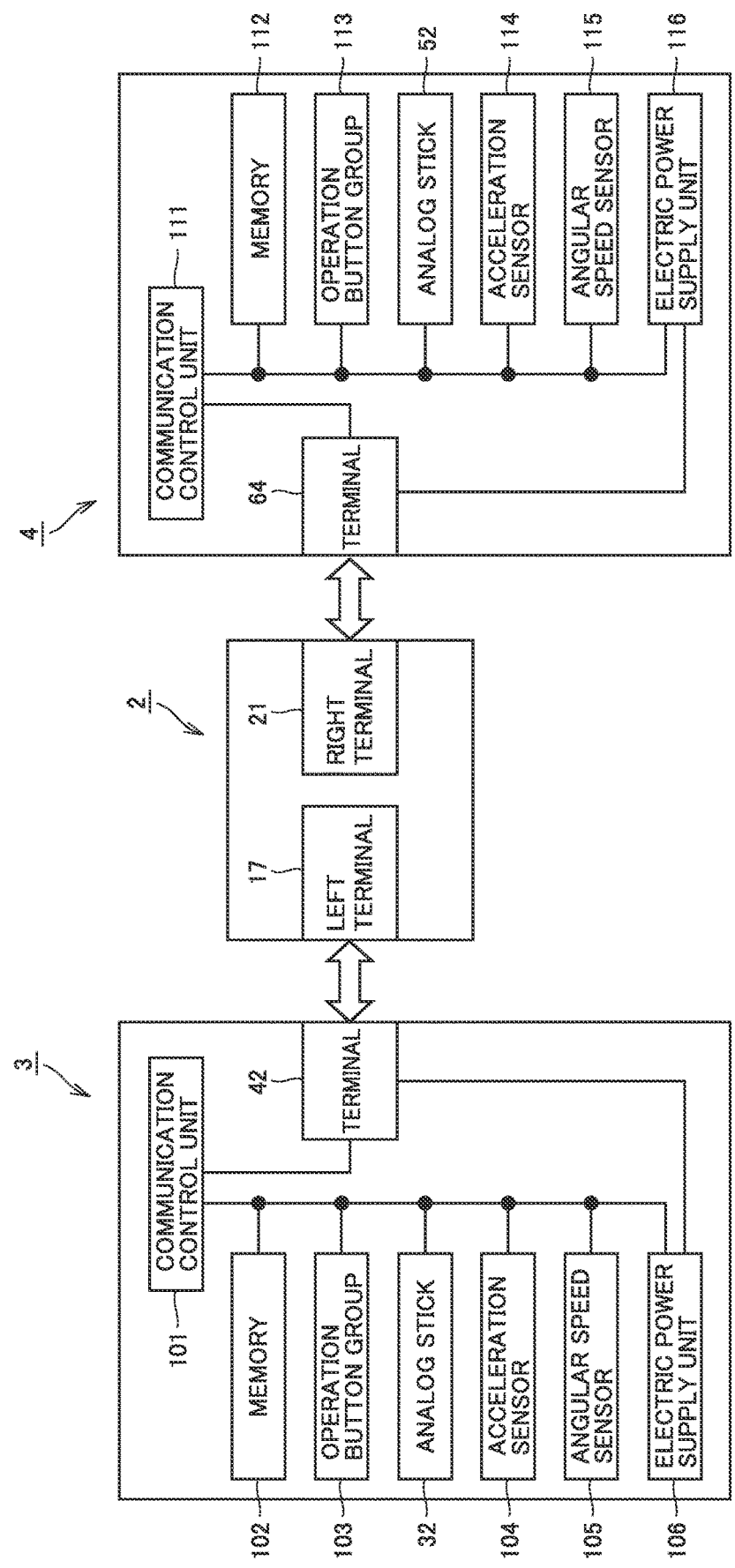
FIG. 3 shows an exemplary illustrative non-limiting drawing illustrating one example of an internal configuration of a left controller and a right controller constituting the information processing system according to the present embodiment.

One example of an internal configuration of left controller 3 and right controller 4 constituting information processing system 1 according to the present embodiment will be described with reference to FIG. 3. FIG. 3 also depicts components of main body apparatus 2 associated with left controller 3 and right controller 4.

Left controller 3 includes a communication control unit 101 for communication with main body apparatus 2. Communication control unit 101 can communicate with main body apparatus 2 through both of wired communication through terminal 42 and wireless communication not through terminal 42.

Left controller 3 includes, for example, a memory 102 such as a flash memory. Communication control unit 101 is implemented, for example, by a microprocessor and performs various types of processing by executing firmware stored in memory 102.

Left controller 3 includes an operation button group 103 and an analog stick 32. Information on an operation performed onto operation button group 103 and analog stick 32 is repeatedly output to communication control unit 101 with a prescribed period.

Left controller 3 has an acceleration sensor 104 and an angular speed sensor 105. Acceleration sensor 104 detects magnitude of a linear acceleration along directions of prescribed three axes (for example, the xyz axes shown in FIG. 1). Angular speed sensor 105 detects angular speeds around prescribed three axes (for example, the xyz axes shown in FIG. 1). A result of detection by acceleration sensor 104 and angular speed sensor 105 is repeatedly output to communication control unit 101 with a prescribed period.

Communication control unit 101 obtains information on an input from each of operation button group 103, analog stick 32, acceleration sensor 104, and angular speed sensor 105 (for example, information on an operation by a user or a result of detection by the sensor). Communication control unit 101 transmits data including obtained information (or information obtained by subjecting obtained information to prescribed processing) to main body apparatus 2. Data is transmitted to main body apparatus 2 repeatedly with a prescribed period.

Left controller 3 includes an electric power supply unit 106 including a battery and an electric power control circuit. Electric power supply unit 106 controls supply of electric power to each component of left controller 3. When left controller 3 is attached to main body apparatus 2, the battery is charged by power feed from main body apparatus 2 through terminal 42.

Right controller 4 is configured basically similarly to left controller 3 described above. Right controller 4 includes a communication control unit 111, a memory 112, an operation button group 113, an analog stick 52, an acceleration sensor 114, an angular speed sensor 115, and an electric power supply unit 116.

Since other components of right controller 4 have features and functions the same as those of corresponding components described in connection with left controller 3, detailed description will not be repeated.

(a4: Program/Data Stored in Main Body Apparatus 2)

Figure 4:
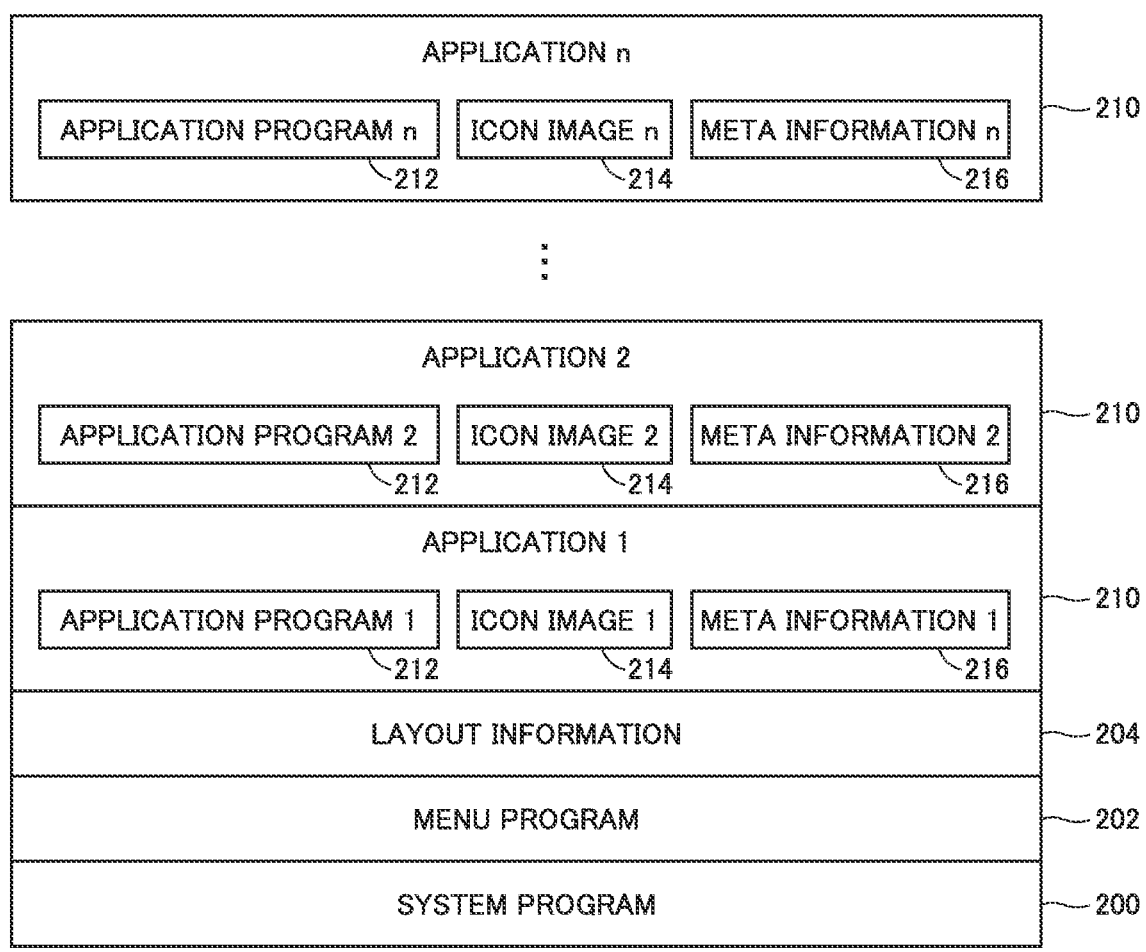
FIG. 4 shows an exemplary illustrative non-limiting drawing illustrating one example of a program and data stored in the main body apparatus constituting the information processing system according to the present embodiment.

One example of a program and data stored in main body apparatus 2 constituting information processing system 1 according to the present embodiment will be described with reference to FIG. 4. Flash memory 84 which is an internal storage medium of main body apparatus 2 stores a system program 200, a menu program 202, layout information 204, and at least one application 210.

System program 200 is a program for implementing basic information processing in main body apparatus 2 and may include codes corresponding to an operating system (OS) and a library.

Menu program 202 presents contents of at least one application 210 to a user and has execution of a selected application started in response to an operation by a user. Details of processing performed by menu program 202 will be described later.

Processing and functions provided by information processing system 1 according to the present embodiment are typically implemented by execution of system program 200 and menu program 202 by CPU 81 of main body apparatus 2. Therefore, one aspect of the present technology is directed to a program including system program 200 and menu program 202. These programs may be stored in advance in flash memory 84 which is an internal storage medium of main body apparatus 2 or provided by any recording medium.

Layout information 204 defines an order of arrangement and a display size of icons in a menu image generated by execution of menu program 202. Details of layout information 204 will also be described later.

Application 210 may be installed in main body apparatus 2 as being downloaded from an external server through a network or installed in main body apparatus 2 from any external storage medium (for example, an SD card or a dedicated memory card). Application 210 may be installed in main body apparatus 2 in response to an explicit operation by a user or may automatically be distributed from a server.

Each application 210 includes an application program 212 which is an entity providing the application, an icon image 214 which graphically expresses each application 210, and meta information 216 including various types of information relating to each application 210. A plurality of icon images 214 may be associated with each application 210.

Typically, application program 212 included in application 210 may be a game program, a business application, or an application providing various services.

[B. Menu Image]

A menu image provided by information processing system 1 according to the present embodiment will now be described.

Figure 5:
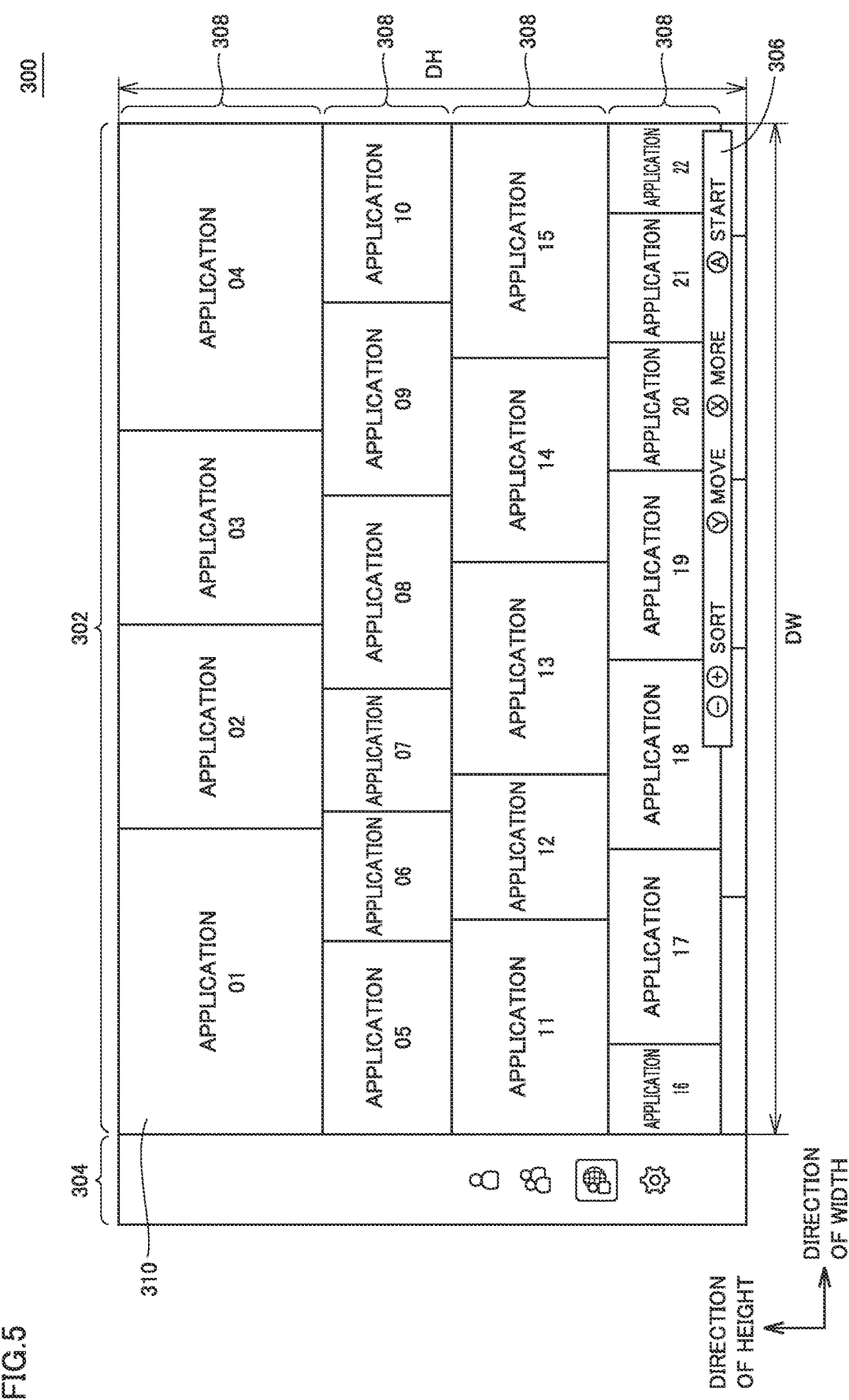
FIGS. 5 to 9 show exemplary illustrative non-limiting drawings illustrating examples of a menu image provided by the information processing system according to the present embodiment.

One example of a menu image 300 provided by information processing system 1 according to the present embodiment will be described with reference to FIGS. 5 to 9. Referring to FIG. 5, menu image 300 includes a menu region 302 and an operation acceptance region 304. Icons 310 which graphically express respective applications are shown as being aligned in menu region 302.

The term "icon" herein encompasses an image which explicitly or implicitly shows association thereof with an application, and a size or a content of the image is not limited. The term "icon" can cover not only still images but also moving images.

When application program 212 included in application 210 is a game program sold in the past, corresponding icon image 214 and icon 310 provided by icon image 214 may be a package image of the game program sold in the past. For example, an example is assumed that a game program is provided as being distributed to information processing system 1, although the game program was sold in the past in any storage medium such as a dedicated memory card in a package. In such a case, by using an image which graphically expresses the package, a user can know at a glance what the application is.

In menu region 302, a series of icons 310 along a horizontal direction of the sheet plane (which is referred to as a "direction of width" below for the sake of convenience) is identical in length (which is referred to as a "height" below for the sake of convenience) in a vertical direction of the sheet plane (which is referred to as a "direction of height" below for the sake of convenience). The series of icons 310, however, is not necessarily identical in length in the direction of width (which is referred to as a "width" below for the sake of convenience). A region where icons 310 identical in height are arranged as being aligned along the direction of width is referred to as a "row" for the sake of convenience. In the example shown in FIG. 5, four rows 308 are defined in menu region 302. In a top or bottom row 308, some of icons may not be shown.

As shown in FIG. 5, each icon 310 shown in menu region 302 in a list is shown with its length-to-width ratio (a ratio between a height and a width; which is also referred to as an aspect ratio) being maintained and with its size being adjusted in accordance with relation with other icons 310 belonging to the same row 308.

A height of row 308 in menu region 302 is not necessarily fixed either, and an optimal height is determined in accordance with a length-to-width ratio of icon 310 arranged in each row 308.

Information processing system 1 according to the present embodiment has a function to optimize a display size of each icon in showing icons in menu region 302 in a list. In the description below, a display width of menu region 302 is denoted as DW and a display height is denoted as DH.

A user can select any icon 310 among icons 310 shown in a list by operating operation button group 103 in left controller 3 or operation button group 113 in right controller 4.

Figure 6:
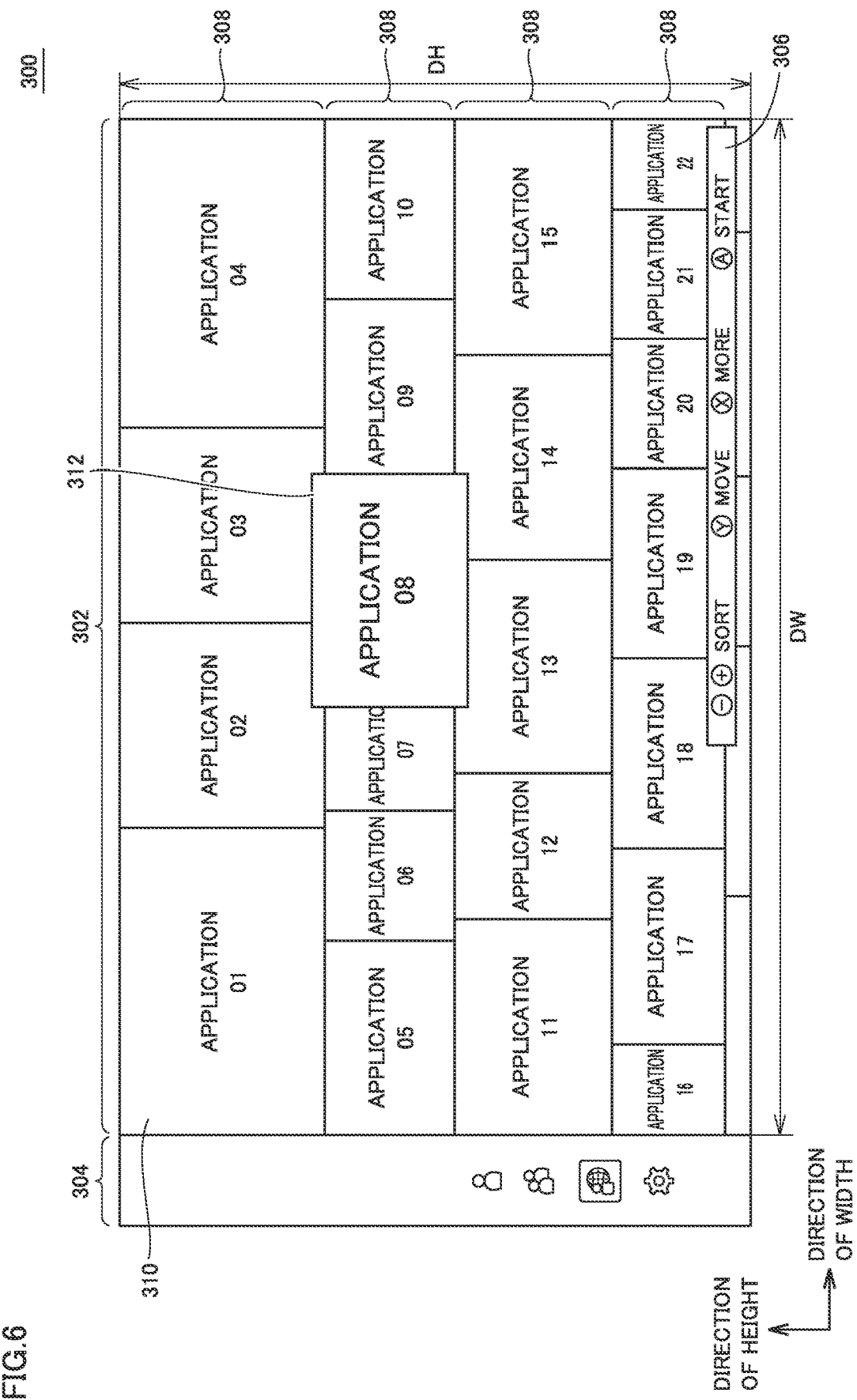

FIG. 6 shows one example of a state that icon 310 shown in menu region 302 has been selected. In FIG. 6, icon 310 of an "application 08" has been selected, and while icon 310 is selected, icon 310 is shown as being enlarged (an icon 312 shown as being enlarged). When the user further performs an operation while icon 310 shown in FIG. 6 is selected, selected icon 310 is arranged at any position in any row.

As shown in FIG. 6, selected icon 310 may be shown with an icon image relatively greater in display size than before selection.

Figure 7:
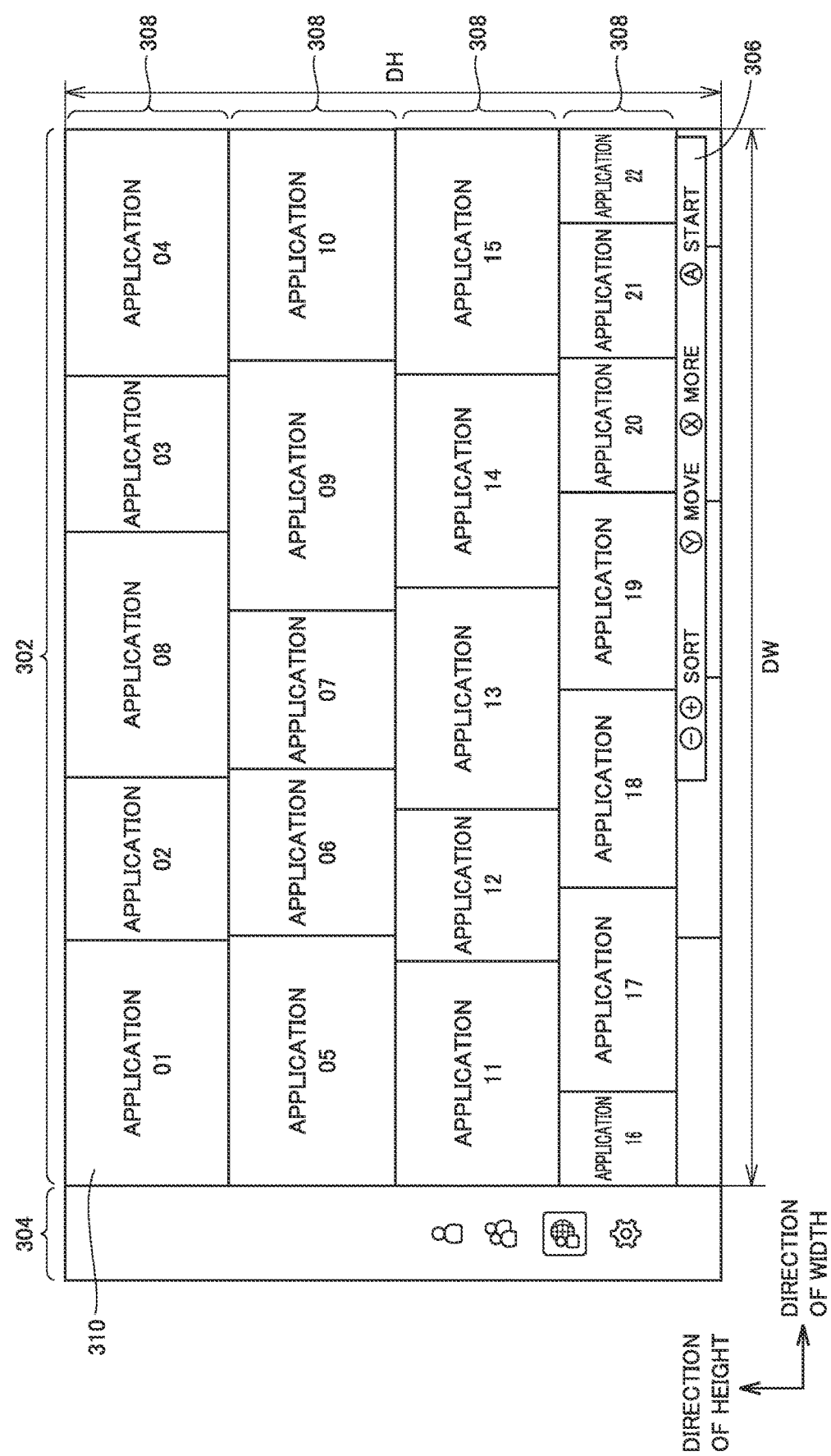

FIG. 7 shows an example in which icon 310 of "application 08" is arranged in top row 308. As row 308 where "application 08" is arranged is changed, a display size of icons in each of rows 308 is also adjusted.

When FIGS. 6 and 7 are compared with each other, the number of icons 310 arranged in top row 308 is changed from four to five. Therefore, icons 310 are shown with their sizes being reduced as a whole (reduced in size in the direction of height), with increase in number of icons 310. The number of icons 310 arranged in second row 308 is changed from six to five. Therefore, icons 310 are shown as being increased in size as a whole (increased in size in the direction of height).

Figure 8:
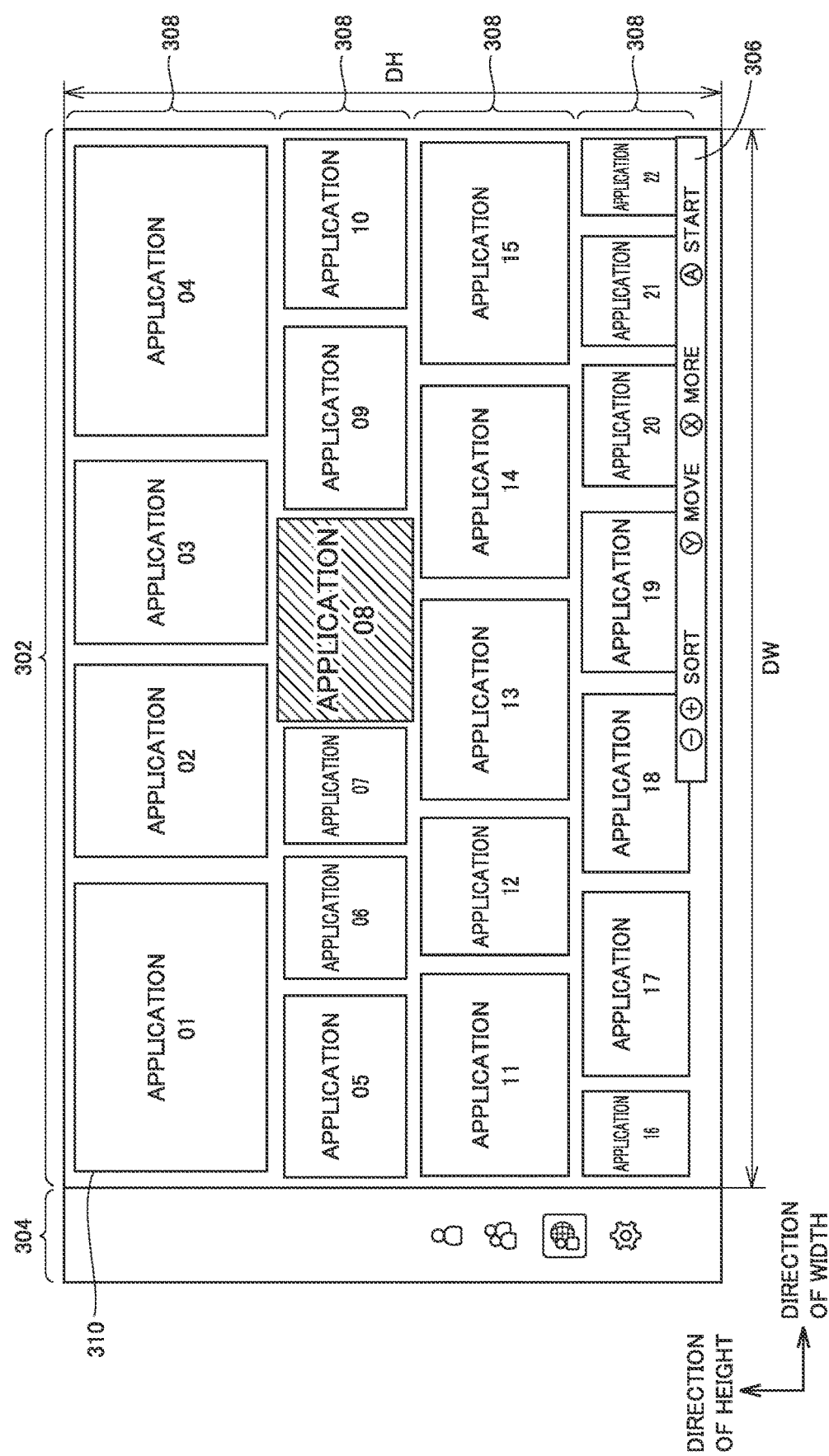

Instead of showing selected icon 310 as being enlarged from the state before selection as shown in FIG. 6, icons 310 other than selected icon 310 may be shown as being reduced in size. FIG. 8 shows one example of a state that icons 310 other than selected icon 310 are shown as being reduced in size. Selected icon 310 may thus be shown with an icon image relatively greater in display size than before selection.

According to a manner of representation as shown in FIG. 8, a user can intuitively recognize that selected icon 310 can be inserted in any gap between adjacent icons 310. By adopting the manner of representation as shown in FIG. 8, a user can be informed of the fact that positions of arrangement of arbitrarily selected icons 310 can be varied and the positions to be varied can arbitrarily be selected.

Selected icon 310 may be shown as being enlarged from the state before selection and icons 310 other than selected icon 310 may be shown as being reduced in size.

An operation instruction image 306 is also shown in menu region 302. Operation instruction image 306 shows an operation by a user on operation button group 103 in left controller 3 or operation button group 113 in right controller 4 and a corresponding content of processing.

Specifically, as a specific operation button (corresponding to "−") in operation button group 103 in left controller 3 and a specific operation button (corresponding to "+") in operation button group 113 in right controller 4 are operated, a rule for sorting icons 310 shown in menu region 302 in a list is changed (corresponding to processing for "sort").

As a specific operation button (corresponding to "Y") in operation button group 113 in right controller 4 is operated, a range of representation of icons in menu region 302 is changed (corresponding to processing for "move"). Representation contents in menu region 302 are scrolled.

As a specific operation button (corresponding to "X") in operation button group 113 in right controller 4 is operated, detailed information on a program corresponding to an icon selected in menu region 302 is shown (corresponding to processing for "more").

Figure 9:
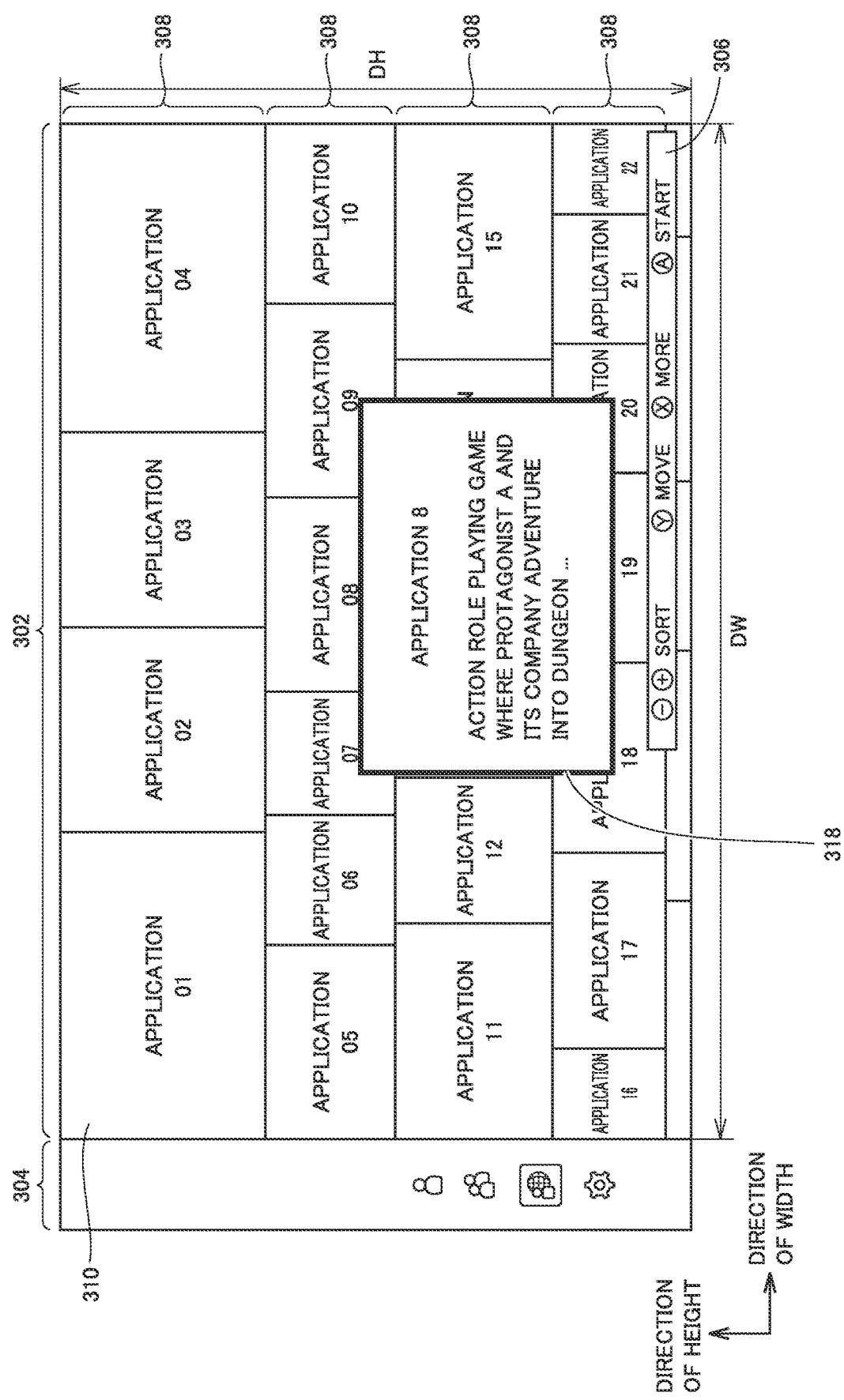

FIG. 9 shows one example of a state that a detailed information object 318 is shown on menu region 302. In FIG. 9, detailed information object 318 representing detailed information on a program corresponding to "application 08" is arranged over icon 310. Detailed information shown in detailed information object 318 may be included in corresponding meta information 216 (see FIG. 4).

As a specific operation button (corresponding to "A") in operation button group 113 in right controller 4 is operated, execution of a program corresponding to an icon selected in menu region 302 is started (corresponding to processing for "start").

[C. Processing for Generating Menu Image]

Processing for generating menu image 300 as shown in FIGS. 5 to 9 will now be described.

In the description below, the terms "image size" and "display size" are used as being distinguished from each other. The "image size" means a size of icon image 214 (see FIG. 4) used for showing icon 310. The "display size" means a size of an icon when it is shown in menu region 302 in menu image 300. Normally, both of the "image size" and the "display size" are defined by the number of pixels in the direction of height and the direction of width.

In information processing system 1 according to the present embodiment, a plurality of icon images 214 associated with applications 210 include icon images not identical in image size. The plurality of icon images 214 are not in common but may be varied in image size. Even when icon images 214 not identical to one another in image size are used, menu image 300 made up of icons of which display size has been adjusted can be provided.

A display size of icon 310 shown in menu region 302 in menu image 300 is mainly determined by three types of processing for each row 308 (1) for determining a provisional height of a row, (2) for calculating a maximum width of an icon arranged in the row, and (3) for determining a display size of each icon in accordance with the calculated maximum width.

(1) Determination of Provisional Height of Row

Processing for determining a provisional height in connection with a display size of an icon on menu image 300 provided by information processing system 1 according to the present embodiment will be described with reference to FIGS. 10 and 11.

Figure 10:
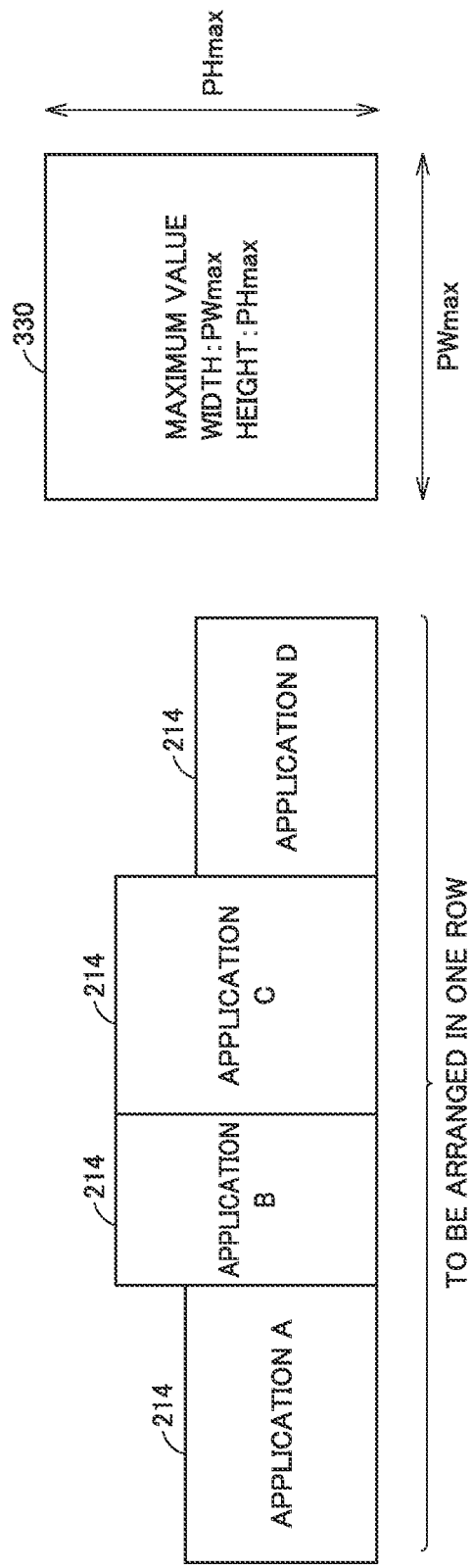
FIGS. 10 and 11 show exemplary illustrative non-limiting drawings illustrating processing for determining a provisional height in connection with a display size of an icon on the menu image provided by the information processing system according to the present embodiment.

As shown in FIG. 10, initially, it is assumed that a maximum value (a maximum width PWmax and a maximum height PHmax) of an image size of icon image 214 which can be included in application 210 is defined (a maximum image size 330). Display width DW of menu region 302 of menu image 300 corresponds to a maximum value of a width of a group of icons arranged in one row (that is, a maximum width per one row). By way of example, display width DW of menu region 302 may be set to approximately two times as large as maximum width PWmax of icon image 214.

Icon image 214 corresponding to an icon to be arranged in one certain row is selected under a prescribed rule. In the example shown in FIG. 10, four icon images 214 corresponding to applications A to D, respectively, are selected.

Figure 11:
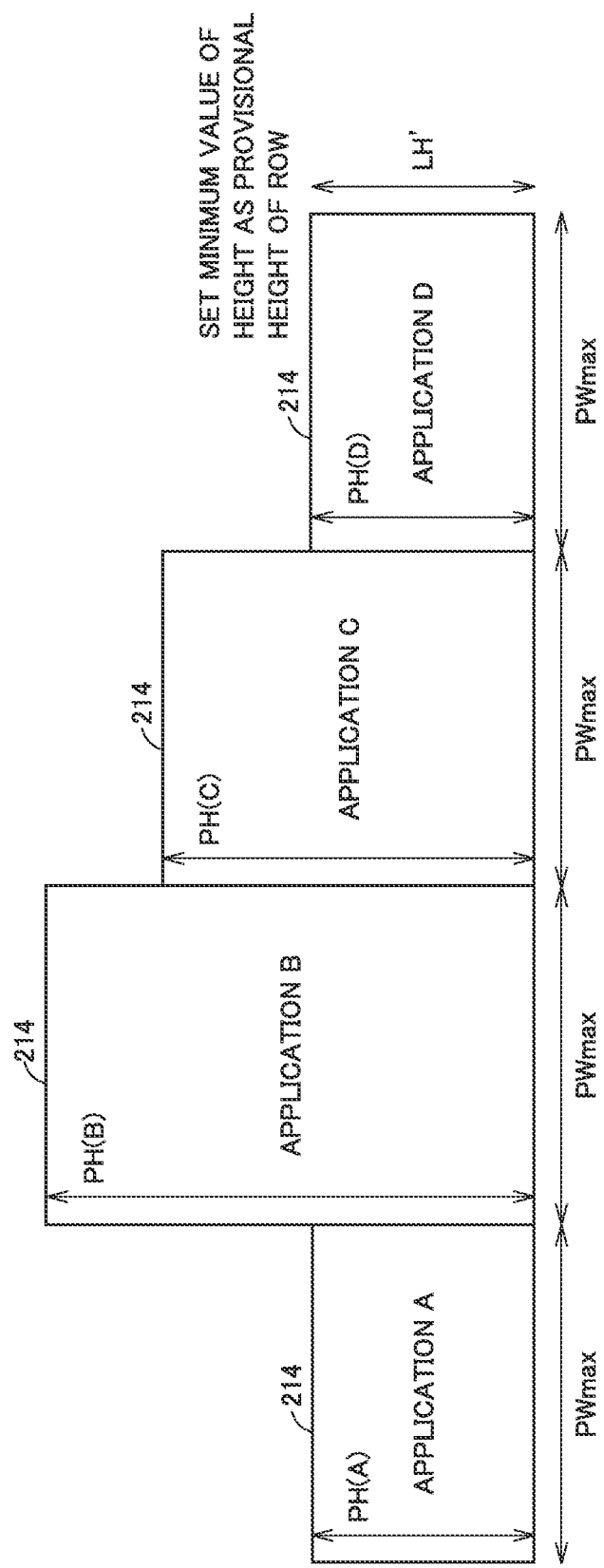

As shown in FIG. 11, each selected icon image 214 is enlarged with its length-to-width ratio being maintained such that a width thereof matches with maximum width PWmax. Heights of enlarged icon images 214 are denoted as PH(A) to PH(D), respectively. A minimum value of heights PH(A) to PH(D) of enlarged icon images 214 is determined as a provisional height LH' of the row. When provisional height LH' exceeds maximum height PHmax, maximum height PHmax is determined as provisional height LH' (that is, provisional height LH' maximum height PHmax).

(2) Calculation of Maximum Width of Icon Arranged in Row

In succession, a maximum width PWtotal of icons arranged in a row is calculated.

Figure 12:
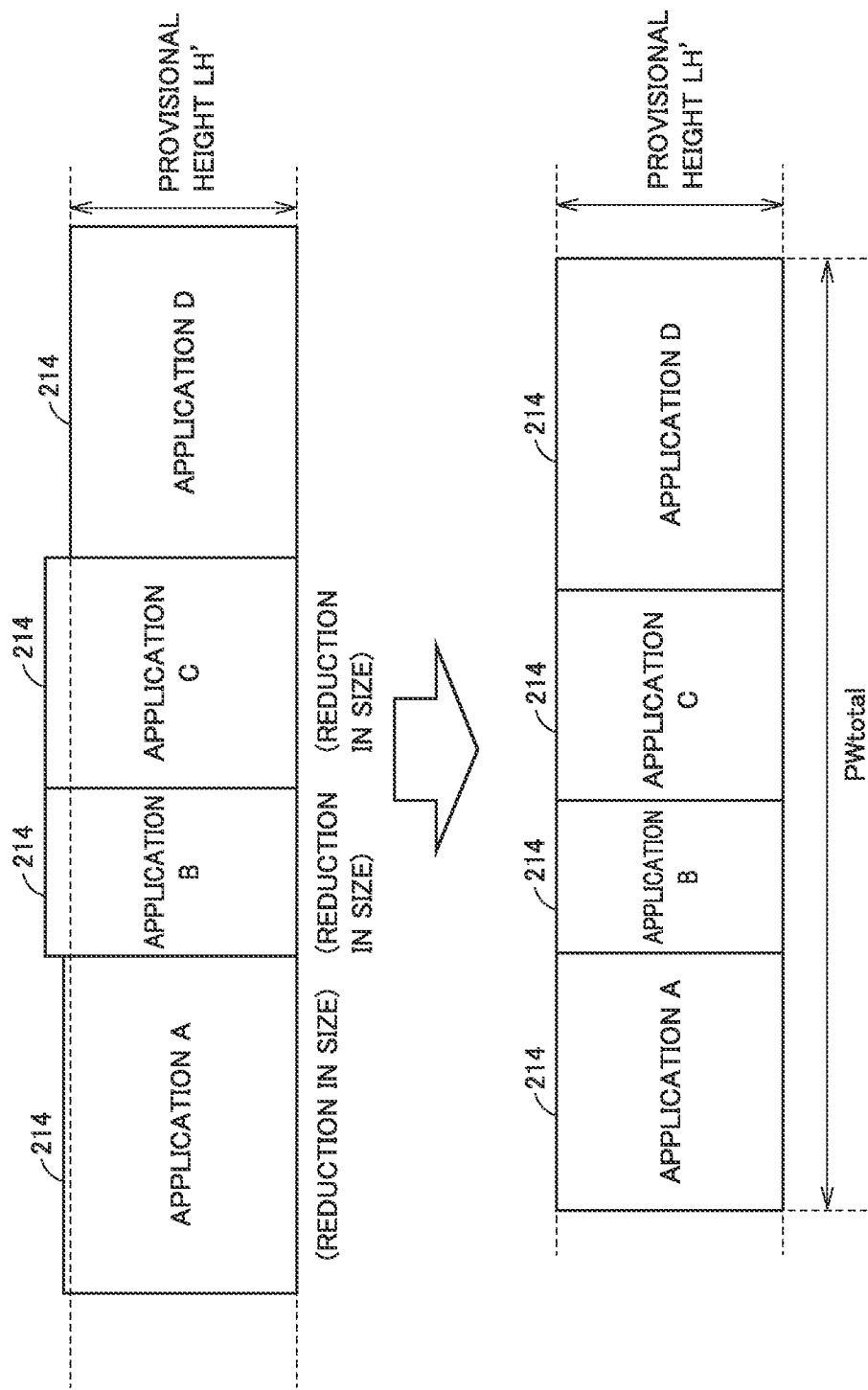
FIG. 12 shows an exemplary illustrative non-limiting drawing illustrating processing for calculating a maximum width of an icon arranged in a row on the menu image provided by the information processing system according to the present embodiment.

FIG. 12 is a diagram for illustrating processing for calculating a maximum width of icons arranged in a row on menu image 300 provided by information processing system 1 according to the present embodiment. Referring to FIG. 12, a size of icon image 214 is adjusted (reduced) such that its height matches with provisional height LH'. In the example shown in FIG. 12, icon image 214 corresponding to application D is not reduced in size but icon images 214 corresponding to respective applications A, B, and C are reduced in size at respective scale factors with their length-to-width ratios being maintained.

A width of aligned icon images 214 obtained by adjustment (reduction) in size of icon images 214 as such is determined as maximum width PWtotal of icons arranged in a row.

(3) Determination of Display Size of Each Icon in Accordance with Calculated Maximum Width Processing for determining a display size of an icon on menu image 300 provided by information processing system 1 according to the present embodiment will be described with reference to FIGS. 13 and 14.

Figure 13:
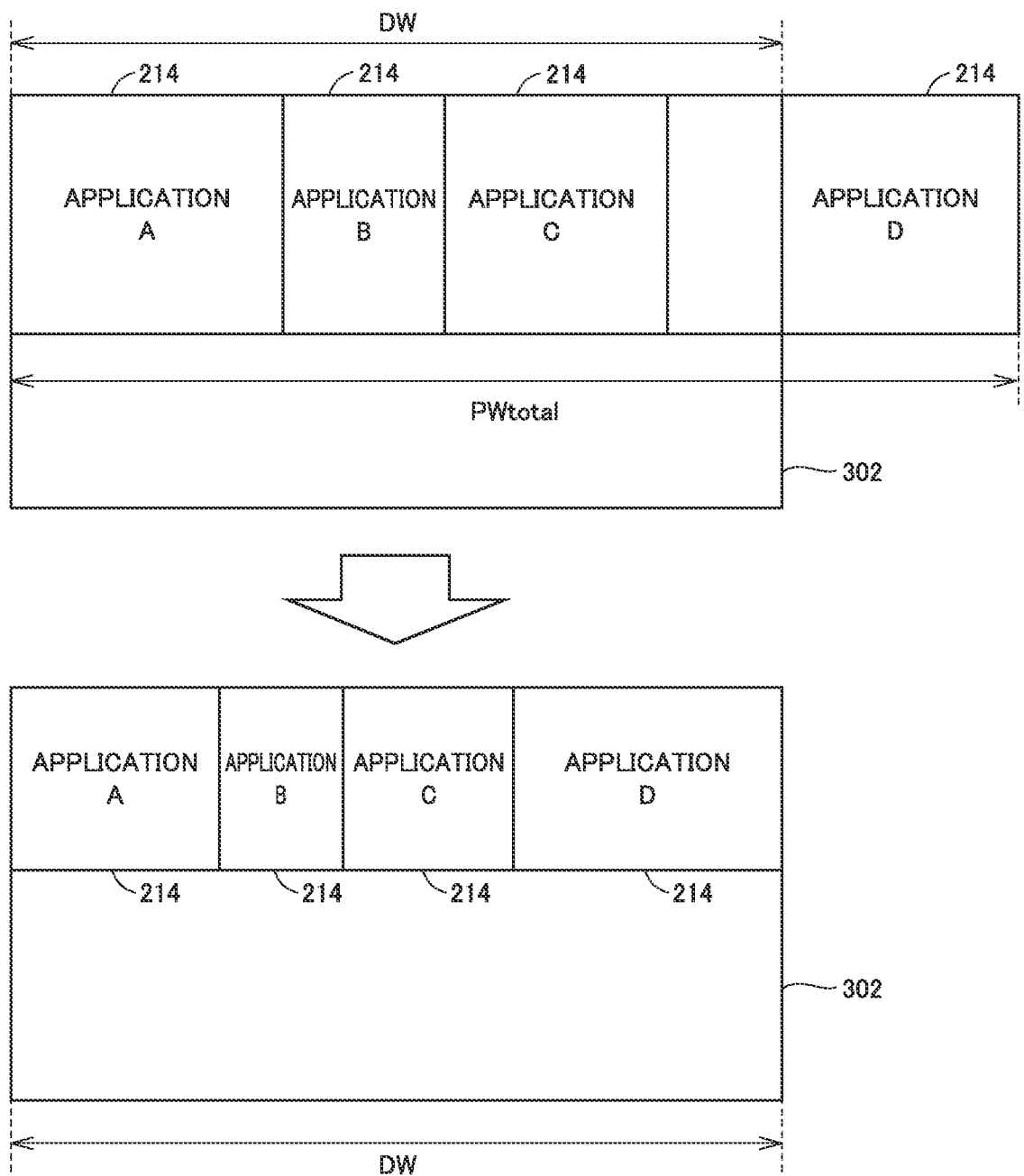
FIGS. 13 and 14 show exemplary illustrative non-limiting drawings illustrating processing for determining a display size of an icon on the menu image provided by the information processing system according to the present embodiment.

As shown in FIG. 13, when maximum width PWtotal of icons arranged in a row exceeds display width DW of menu region 302, icon images 214 of which size has been adjusted is reduced in size as a whole. Icon images 214 are reduced in size at an identical ratio. Through processing above, a display size of icon image 214 is determined.

Figure 14:
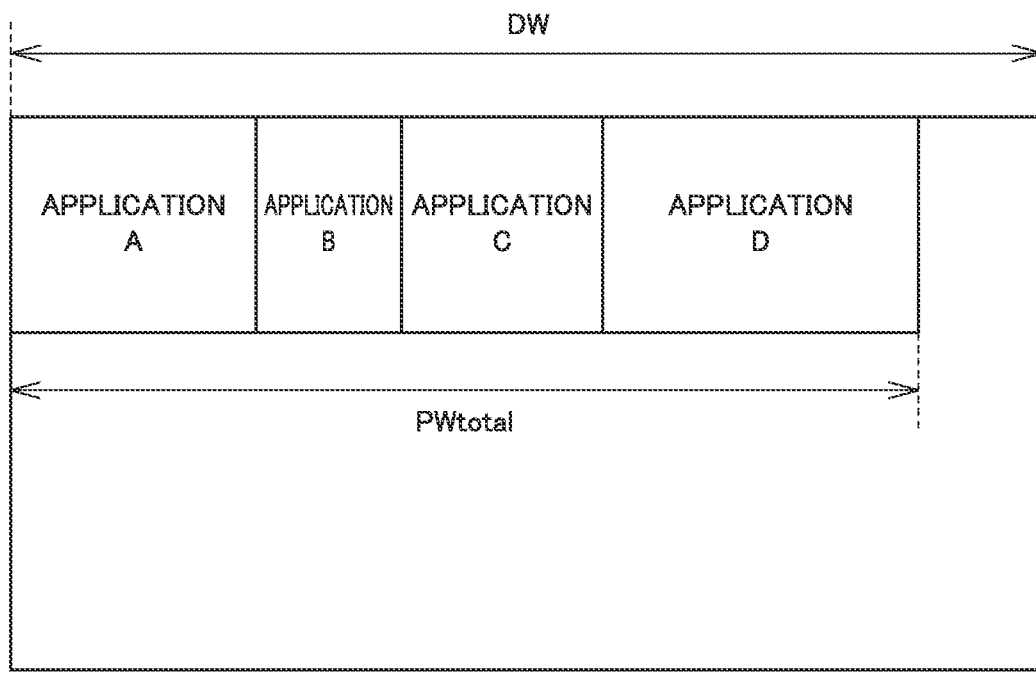

When maximum width PWtotal of icons arranged in a row is smaller than display width DW of menu region 302 as shown in FIG. 14, each icon image 214 of which size has previously been adjusted is not adjusted in size any more. It can be considered that, because provisional height LH' has been determined based on an assumption that a lateral width of each icon image 214 is set to maximum width PWmax, there is no need for further enlargement.

In the example shown in FIG. 14, however, icon images 214 of which size has been adjusted may further be enlarged as a whole.

In accordance with a display size of each icon image 214 determined through the processing as above, icons 310 are shown in menu region 302 in menu image 300 as being aligned.

Though FIGS. 10 to 14 visually show results of adjustment (reduction or increase) in size of icon image 214 for better understanding, in real processing, a display size of icon 310 should only be determined through mathematical processing by using only information on an image size (a height and a width) of icon image 214, and a size of icon image 214 itself does not have to be adjusted (reduced or increased) in a process for determining a display size.

[D. Layout Information]

An order of arrangement and a result of adjustment of a size (a scaling factor) of icons on menu image 300 determined in the processing as described above are stored as layout information 204 (FIG. 4).

Figure 15:
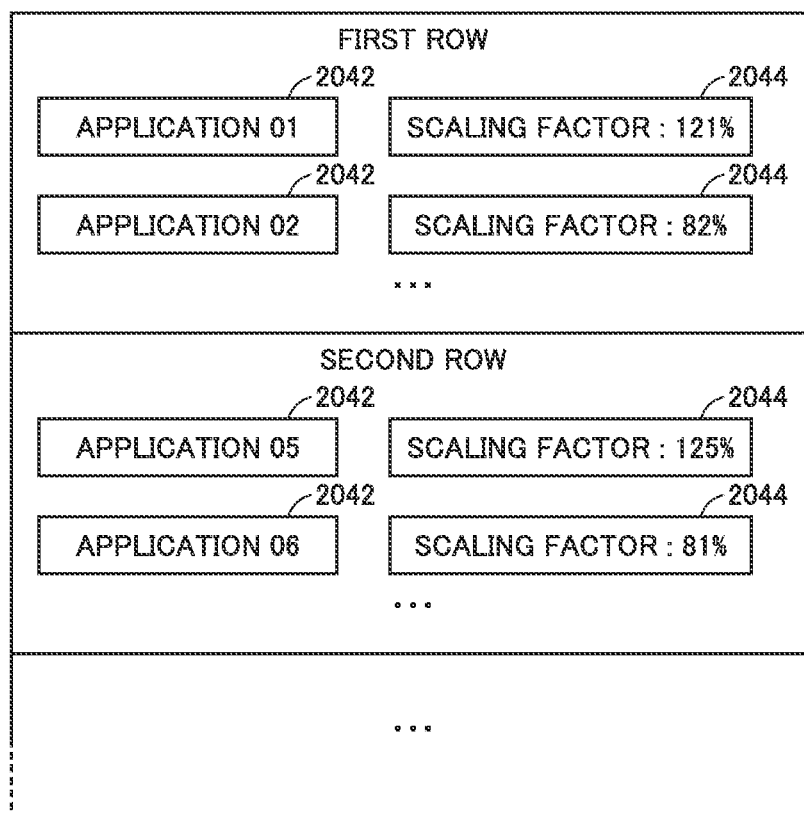
FIG. 15 shows an exemplary illustrative non-limiting drawing illustrating one example of a data content in layout information used in the information processing system according to the present embodiment.

One example of data contents in layout information 204 used in information processing system 1 according to the present embodiment will be described with reference to FIG. 15. Layout information 204 includes information on an icon to be arranged in each of rows 308 in menu image 300 and a scaling factor for showing each icon.

Specifically, layout information 204 includes combinations of an application definition 2042 and a scaling factor 2044 as many as icons to be arranged in corresponding row 308.

Layout information 204 may be updated each time an order of arrangement or a display size of icons on menu image 300 is varied or at the timing of end of representation of menu image 300.

An amount of data necessary for generation of menu image 300 can be reduced by using such layout information 204.

[E. Processing Procedure]

A procedure of processing for providing menu image 300 performed in information processing system 1 according to the present embodiment will now be described.

Figure 16:
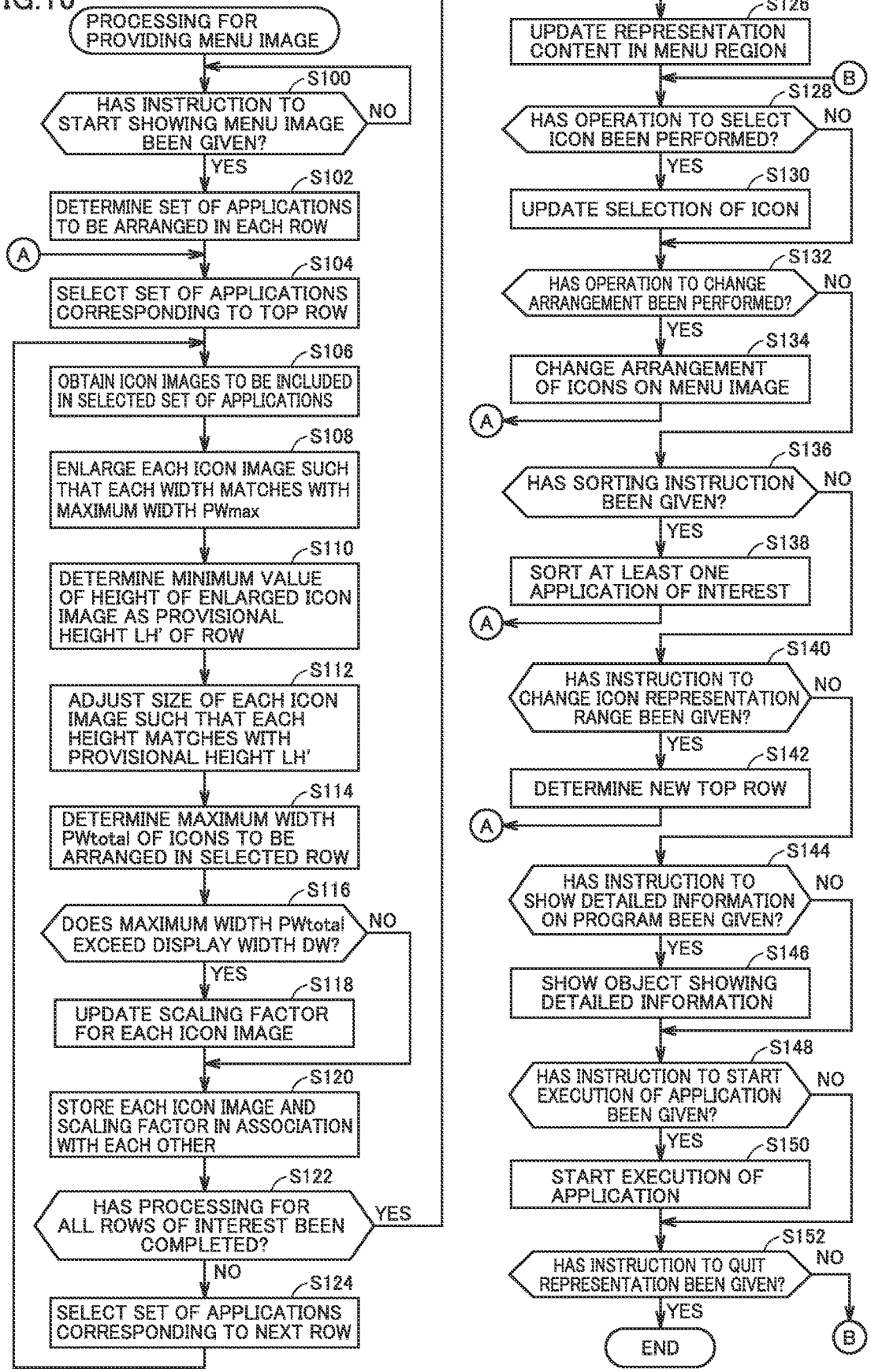
FIG. 16 shows an exemplary illustrative non-limiting flowchart illustrating a procedure of processing for providing the menu image performed in the information processing system according to the present embodiment.

A procedure of processing for providing menu image 300 performed in information processing system 1 according to the present embodiment will be described with reference to FIG. 16. Each step shown in FIG. 16 is typically performed by execution of system program 200 and menu program 202 (FIG. 4) by CPU 81 (FIG. 2) of main body apparatus 2.

Main body apparatus 2 determines whether or not it has received an instruction to start representation of menu image 300 from a user (step S100). When the main body apparatus has not received an instruction to start representation of menu image 300 from the user (NO in step S100), processing in step S100 or subsequent steps is repeated.

When the main body apparatus has received an instruction to start representation of menu image 300 from the user (YES in step S100), main body apparatus 2 performs processing for setting an order of arrangement, for each row in menu region 302, of a plurality of icon images 214 with which respective applications are associated. Specifically, main body apparatus 2 sorts at least one application of interest under a prescribed sorting rule, and determines a set of applications to be arranged in each row (for example, five applications per one row) (step S102). When layout information 204 has already been present, a set of applications to be arranged in each row may be determined based on definition in layout information 204.

Main body apparatus 2 selects a set of applications corresponding to the top row shown on menu image 300 (step S104). Then, the main body apparatus performs display size adjustment processing as shown below. As display size adjustment processing, main body apparatus 2 performs size adjustment processing for determining a display size of each icon image by varying (reducing or increasing) a size of each icon image 214 with its length-to-width ratio being maintained such that icon images 214 included in a row are identical in display height (normally, provisional height LH') in each row in menu region 302 and varying a size of icon images 214 as a whole included in the row at an identical ratio such that a width of the row is set to a prescribed length (display width DW).

Specifically, main body apparatus 2 obtains icon images 214 included in the selected set of applications (step S106) and enlarges each icon image 214 such that its width matches with maximum width PWmax (step S108). Main body apparatus 2 determines a minimum value of heights of enlarged icon images 214 as provisional height LH' of the row (step S110).

In succession, main body apparatus 2 adjusts (reduces) a size of each icon image 214 such that its height matches with provisional height LH' (step S112). As a result of adjustment of the size in step S112, a scaling factor for each icon image 214 is determined. Main body apparatus 2 determines maximum width PWtotal of icons arranged in the selected row from a width at the time when icon images 214 obtained by adjustment (reduction) in size are aligned (step S114).

In succession, main body apparatus 2 determines whether or not maximum width PWtotal determined in step S114 of the icons arranged in the selected row exceeds display width DW of menu region 302 (step S116). When maximum width PWtotal of the icons arranged in the selected row exceeds display width DW of menu region 302 (YES in step S116), main body apparatus 2 determines a reduction ratio such that maximum width PWtotal of the icons arranged in the selected row matches with display width DW of menu region 302 and updates the scaling factor for each icon image 214 by applying the determined reduction ratio to a scaling factor for each icon image 214 (step S118).

When maximum width PWtotal of the icons arranged in the selected row does not exceed display width DW of menu region 302 (NO in step S116), processing in step S118 is skipped.

Main body apparatus 2 stores in association with the selected row, each image obtained by adjusting a size of each icon image 214 included in the selected set of applications at a corresponding scaling factor (step S120). In step S120, main body apparatus 2 may generate layout information 204 (FIG. 4) or update contents thereof. Step S120 may include processing for outputting layout information 204 including information on an order of a plurality of icon images and a display size of each icon image 214.

Main body apparatus 2 determines whether or not processing for all rows of interest has been completed (step S122).

When a row for which processing has not been completed remains (NO in step S122), main body apparatus 2 selects a set of applications corresponding to a next row (step S124) and performs processing in step S106 or subsequent steps again.

When processing for all rows of interest has been completed (YES in step S122), main body apparatus 2 updates contents of representation in menu region 302 based on an image associated with each row (step S126). In step S126, main body apparatus 2 performs image generation processing for generating menu image 300 in which each icon image 214 is arranged for each row in a display size determined in the previous size adjustment processing.

Main body apparatus 2 determines whether or not it has received an operation to select icon 310 on menu image 300 from the user (step S128). When the main body apparatus has received an operation to select icon 310 on menu image 300 from the user (YES in step S128), main body apparatus 2 updates selection of icon 310 on menu image 300 in response to a selection operation by the user (step S130).

When the main body apparatus has not received an operation to select icon 310 on menu image 300 from the user (NO in step S128), processing in step S130 is skipped.

Main body apparatus 2 determines whether or not it has received an operation to change arrangement of selected icon 310 on menu image 300 from the user (step S132). When the main body apparatus has received an operation to change arrangement of selected icon 310 on menu image 300 from the user (YES in step S132), main body apparatus 2 changes arrangement of icon 310 on menu image 300 in response to the operation to change arrangement from the user (step S134). Main body apparatus 2 performs processing for changing arrangement of a plurality of icon images 214 in response to the input instruction. This processing for changing arrangement includes processing for inserting selected icon 310 in any position in any row. Main body apparatus 2 performs again processing in step S104 or subsequent steps.

When the main body apparatus has not received an operation to change arrangement of selected icon 310 on menu image 300 from the user (NO in step S132), main body apparatus 2 determines whether or not it has received an instruction to sort icons 310 on menu image 300 from the user ("sort" shown in FIG. 5) (step S136). When the main body apparatus has received an instruction to sort icons 310 on menu image 300 from the user (YES in step S136), main body apparatus 2 sorts at least one application of interest under a sorting rule different from the previously used prescribed sorting rule and determines a set of applications to be arranged in each row (step S138). Main body apparatus 2 changes arrangement of icons 310 on menu image 300 in accordance with the sorting instruction from the user. This processing for changing arrangement includes processing for sorting a plurality of icon images under a prescribed rule. Main body apparatus 2 performs again processing in step S104 or subsequent steps.

When the main body apparatus has not received an instruction to sort icons 310 on menu image 300 from the user (NO in step S136), main body apparatus 2 determines whether or not it has received an instruction to change a range of representation of icons on menu image 300 from the user (step S140). When the main body apparatus has received an instruction to change the range of representation of icons on menu image 300 from the user (YES in step S140), main body apparatus 2 determines a new top row to be shown on menu image 300 (step S142). For example, a bottom row shown in current menu image 300 may be set as the new top row. Main body apparatus 2 performs again processing in step S104 or subsequent steps.

When the main body apparatus has not received an instruction to change the range of representation of icons on menu image 300 from the user (NO in step S140), main body apparatus 2 determines whether or not it has received an instruction to show detailed information on a program corresponding to icon 310 on menu image 300 from the user ("more" shown in FIG. 5) (step S144). When the main body apparatus has received an instruction to show detailed information on a program corresponding to an icon on menu image 300 from the user (YES in step S144), main body apparatus 2 performs processing for showing detailed information on an application associated with selected icon 310 in response to the input instruction. Specifically, main body apparatus 2 shows an object showing detailed information on menu image 300 based on meta information 216 of the application corresponding to selected icon 310 (step S146).

When the main body apparatus has not received from the user, an instruction to show detailed information on a program corresponding to an icon on menu image 300 (NO in step S144), processing in step S146 is skipped.

Main body apparatus 2 determines whether or not it has received an instruction to start execution of an application corresponding to icon 310 on menu image 300 from the user ("start" shown in FIG. 5) (step S148). When the main body apparatus has received an instruction to start execution of an application corresponding to icon 310 on menu image 300 from the user (YES in step S148), main body apparatus 2 starts execution of application 210 (the entity being application program 212) corresponding to selected icon 310 (step S150). Main body apparatus 2 starts execution of application 210 associated with icon 310 of interest in response to an instruction onto any icon 310.

When the main body apparatus has not received an instruction to start execution of an application corresponding to icon 310 on menu image 300 from the user (NO in step S148), processing in step S150 is skipped.

Main body apparatus 2 determines whether or not it has received an instruction to quit representation of menu image 300 from the user (step S152). When the main body apparatus has received an instruction to quit representation of menu image 300 from the user (YES in step S152), main body apparatus 2 quits processing for showing menu image 300. In contrast, when the main body apparatus has not received an instruction to quit representation of menu image 300 from the user (NO in step S152), processing in step S128 or subsequent steps is repeated.

Processing in steps S106 to S120 may end not when processing for all rows of interest ends but when a total height of at least one row with which images are associated exceeds display height DH of menu region 302. In this case, in step S122, whether or not a total height of at least one row with which images are associated exceeds display height DH of menu region 302 is determined.

[F. Other Functions]

Information processing system 1 according to the present embodiment may have a function as below alone or in combination with other functions.

(f1: Sorting)

One example of sorting processing on the menu image provided by information processing system 1 according to the present embodiment will be described. In the present embodiment, contents in meta information 216 included in each application 210 are sorted under a rule designated by a user.

Figure 17:
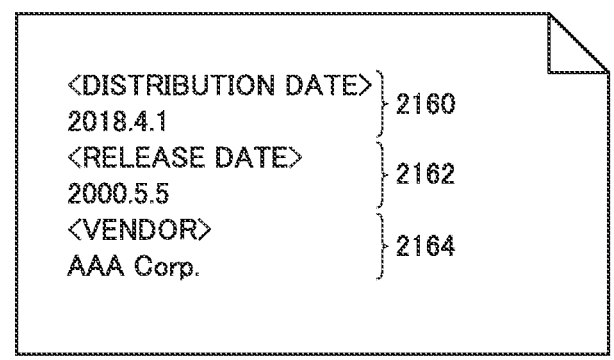
FIG. 17 shows an exemplary illustrative non-limiting drawing illustrating one example of a data content in meta information used in the information processing system according to the present embodiment.

One example of data contents in meta information 216 used in information processing system 1 according to the present embodiment will be described with reference to FIG. 17. Meta information 216 includes distribution date information 2160, release date information 2162, and vendor information 2164 in connection with corresponding application 210.

Distribution date information 2160 represents a date on which distribution of corresponding application 210 was started. Release date information 2162 represents a date on which corresponding application 210 was released. Vendor information 2164 represents an entity (a company name or the like) which sells corresponding application 210.

Sorting rules include, in addition to customization arbitrarily designated by a user, an order of names of titles, an order of distribution dates, an order of release dates, and an order of vendors. Sorting may be based on the number of distributed copies, the number of favorites, the number of players, and rating. Any at least one of rules as described above may be adopted as a sorting rule.

For example, when a user performs a sorting operation on menu image 300 as shown in FIGS. 5 to 9, a rule applied among the plurality of sorting rules may cyclically be varied.

(f2: Extra Application)

When an icon shown in a list in the menu image provided by information processing system 1 according to the present embodiment is executed, a corresponding application may be executable under extra initial setting. In an example where an application is a game application, a state that an option which cannot be obtained unless a player clears a stage has already been obtained at the time of start of the application or a level or power of a user character has already been made higher than an original initial value is assumed as the extra initial setting. Furthermore, a state that a resolution or a sound effect in execution of an application has been changed to adapt to the state-of-the-art technology is assumed.

An application executable under such extra initial setting is also referred to as an "extra application" below.

Icon 310 corresponding to a mode in which application 210 is executable under such extra initial setting and icon 310 corresponding to a mode in which application 210 is executable under original initial setting may be shown in the menu image.

Figure 18:
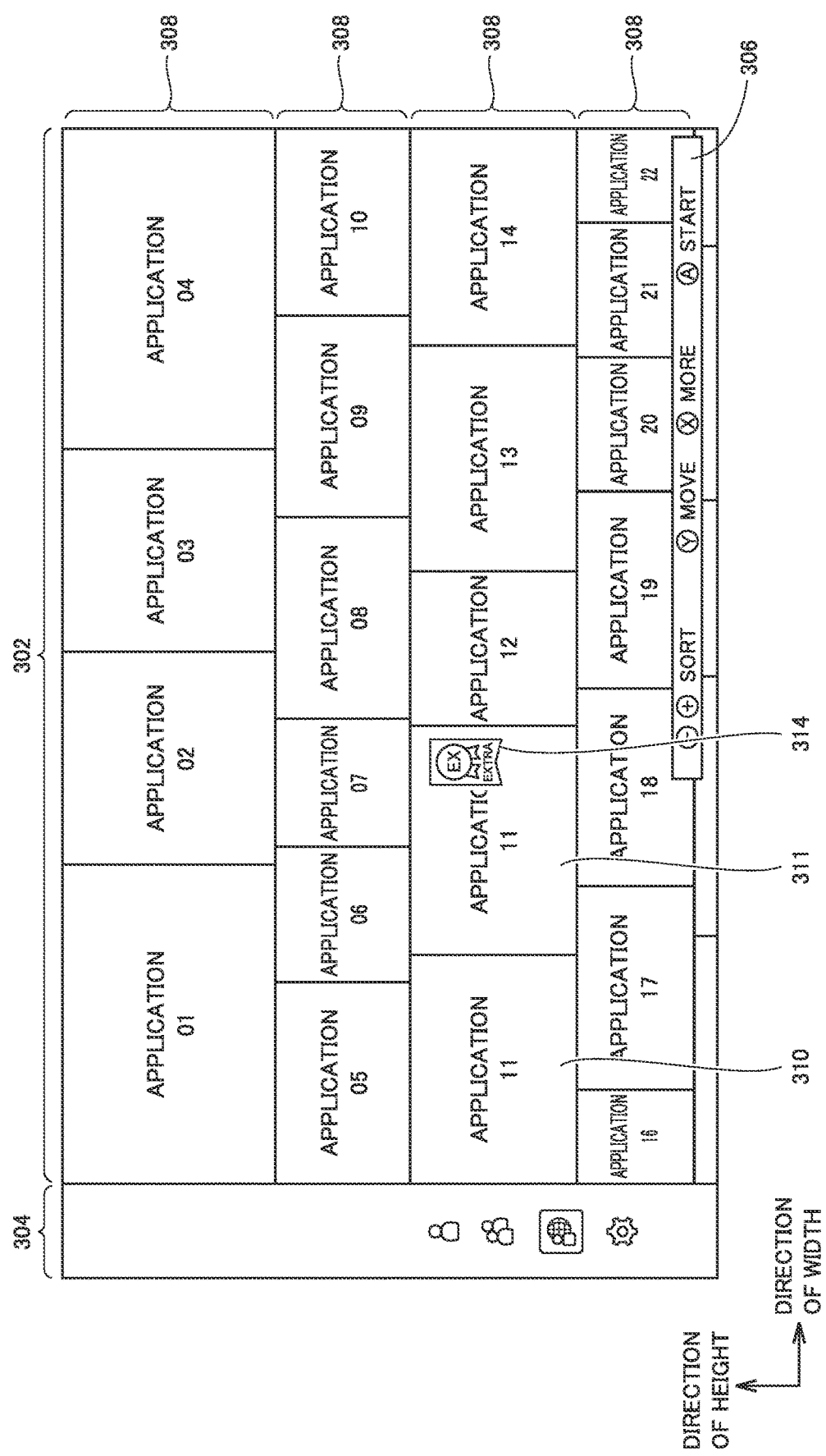
FIG. 18 shows an exemplary illustrative non-limiting drawing illustrating another example of the menu image provided by the information processing system according to the present embodiment.

Another example of menu image 300 provided by information processing system 1 according to the present embodiment will be described with reference to FIG. 18. In menu image 300 shown in FIG. 18, icon 310 with which an "application 11" is executable under normal initial setting and an icon 311 with which "application 11" is executable under extra initial setting are shown.

In order to show that an application is an extra application, an icon which is addition of an extra mark 314 to icon 310 is adopted as icon 311.

Figure 19:
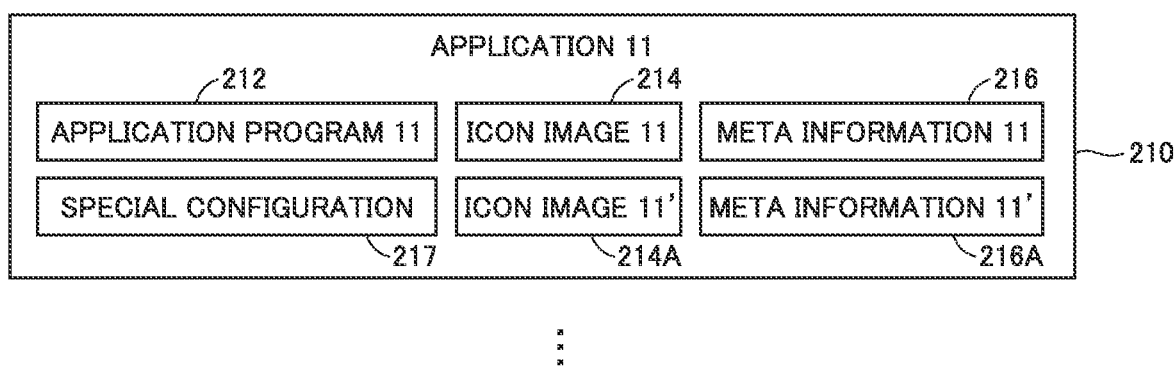
FIG. 19 shows an exemplary illustrative non-limiting drawing illustrating one example of a data structure for implementing extra setting in the menu image provided by the information processing system according to the present embodiment.

One example of a data structure for realizing extra setting in menu image 300 provided by information processing system 1 according to the present embodiment will be described with reference to FIG. 19. Referring to FIG. 19, flash memory 84 of main body apparatus 2 includes as application 210, application program 212, icon image 214 which graphically expresses application 210, and meta information 216 including various types of information on each application 210. Such data is used for executing application 210 under normal initial setting.

The flash memory further includes, as data for executing application 210 under extra initial setting, an extra configuration 217 which describes extra initial setting, an icon image 214A which graphically expresses an extra application, and meta information 216A including various types of information as the extra application. Start from such extra initial setting may be realized by reading and execution by application program 212, of extra configuration 217 (setting information) defining extra initial setting.

The same application 210 may thus be configured to be executable under normal initial setting and extra initial setting and icon images corresponding to respective modes may be prepared. An icon image may include icon image 214 (icon 310) associated with start of one application 210 from a normal initial state (a first state) and icon image 214A (icon 311) associated with start of the same application 210 from an extra initial state different from the normal initial state.

Though FIG. 19 shows an example in which an icon image different for each mode is prepared, an icon corresponding to an extra application may dynamically be generated by adding an extra image (for example, mark 314 shown in FIG. 18) to a normal icon image.

(f3: Representation of being Latest)

A prescribed icon for an application which satisfies a prescribed condition may be shown, rather than an icon showing icon image 214 associated with that application.

For example, when such a configuration that an application is automatically distributed from a server to information processing system 1 is adopted, new distribution can be set as a prescribed condition. For a newly distributed application, an icon may be shown in a manner different from a normal manner.

Figure 20:
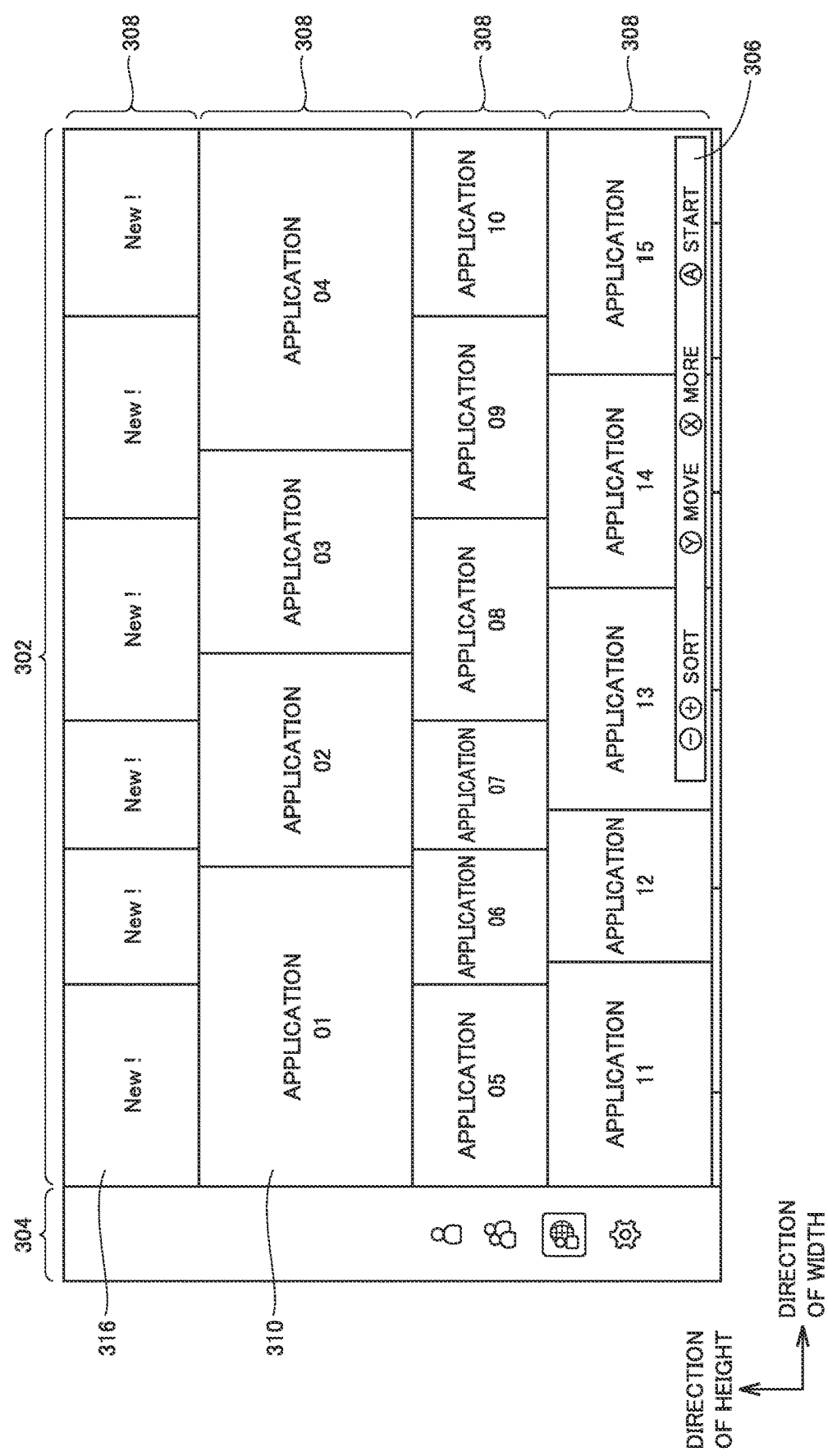
FIG. 20 shows an exemplary illustrative non-limiting drawing illustrating yet another example of the menu image provided by the information processing system according to the present embodiment.

Yet another example of menu image 300 provided by information processing system 1 according to the present embodiment will be described with reference to FIG. 20. In menu image 300 shown in FIG. 20, a newly distributed application is expressed with an icon 316 labeled with "New!". As a user selects icon 316, representation of the icon may change to original icon 310 of a corresponding application.

Thus, for a newly distributed application, such a form of representation is adopted that, immediately after distribution thereof, an icon 316 not allowing a user to identify what the application is, and as the user selects icon 316, the newly distributed application becomes recognizable. The user can thus be encouraged to have expectations for the newly distributed application.

(f4: A Plurality of Information Processing Apparatuses)

In information processing system 1 according to the present embodiment, layout information 204 (FIG. 4) for providing menu image 300 may be prepared. By using such layout information 204, menu image 300 identical among a plurality of information processing apparatuses can also be provided. By distributing layout information 204 to a plurality of information processing apparatuses in which the same application has been installed, identical menu image 300 can also be provided in all information processing apparatuses.

Figure 21:
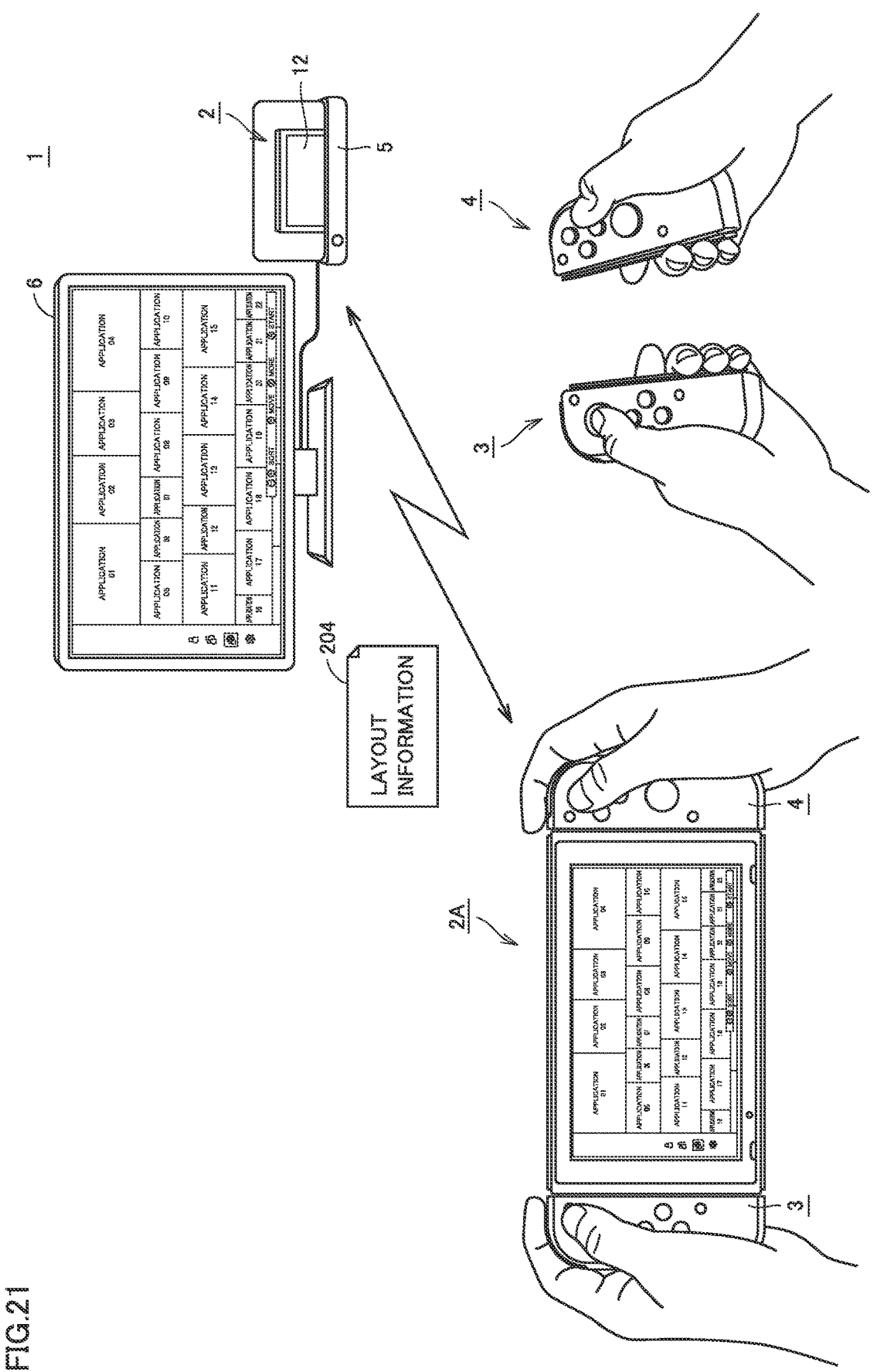
FIG. 21 shows an exemplary illustrative non-limiting drawing illustrating an application example in which layout information provided by the information processing system according to the present embodiment is used.

An application example where layout information 204 provided by information processing system 1 according to the present embodiment is used will be described with reference to FIG. 21. Information processing system 1 includes, in addition to main body apparatus 2, a main body apparatus 2A to which left controller 3 and right controller 4 are attached.

By way of example, in an example of online play between main body apparatus 2 and main body apparatus 2A, layout information 204 generated in main body apparatus 2 is transmitted to main body apparatus 2A. Main body apparatus 2A provides a menu image the same as in main body apparatus 2 based on layout information 204 from main body apparatus 2. Main body apparatus 2 may thus further perform a sharing step of sharing layout information 204 with another information processing apparatus during online play.

In information processing system 1 according to the present embodiment, a menu image can readily be shared among a plurality of information processing apparatuses by using layout information 204.

[G. Modification]

Though a menu image in which icons 310 identical in height are arranged along the direction of width in each row is exemplified in the description above, icons 310 identical in width may be arranged along the direction of height without being limited thereto. A region where icons 310 identical in width are arranged along the direction of height is referred to as a "column" (a column 328) for the sake of convenience.

One example of a menu image 300A provided by information processing system 1 according to a modification of the present embodiment will be described with reference to FIG. 22. Menu image 300A includes menu region 302 and operation acceptance region 304. In menu region 302, icons 310 which graphically express respective applications are shown as being aligned. In menu region 302, a series of icons 310 along the direction of height is identical in length (width) in the direction of width. The series of icons 310 is not necessarily identical in length (height) in the direction of height.

Figure 22:
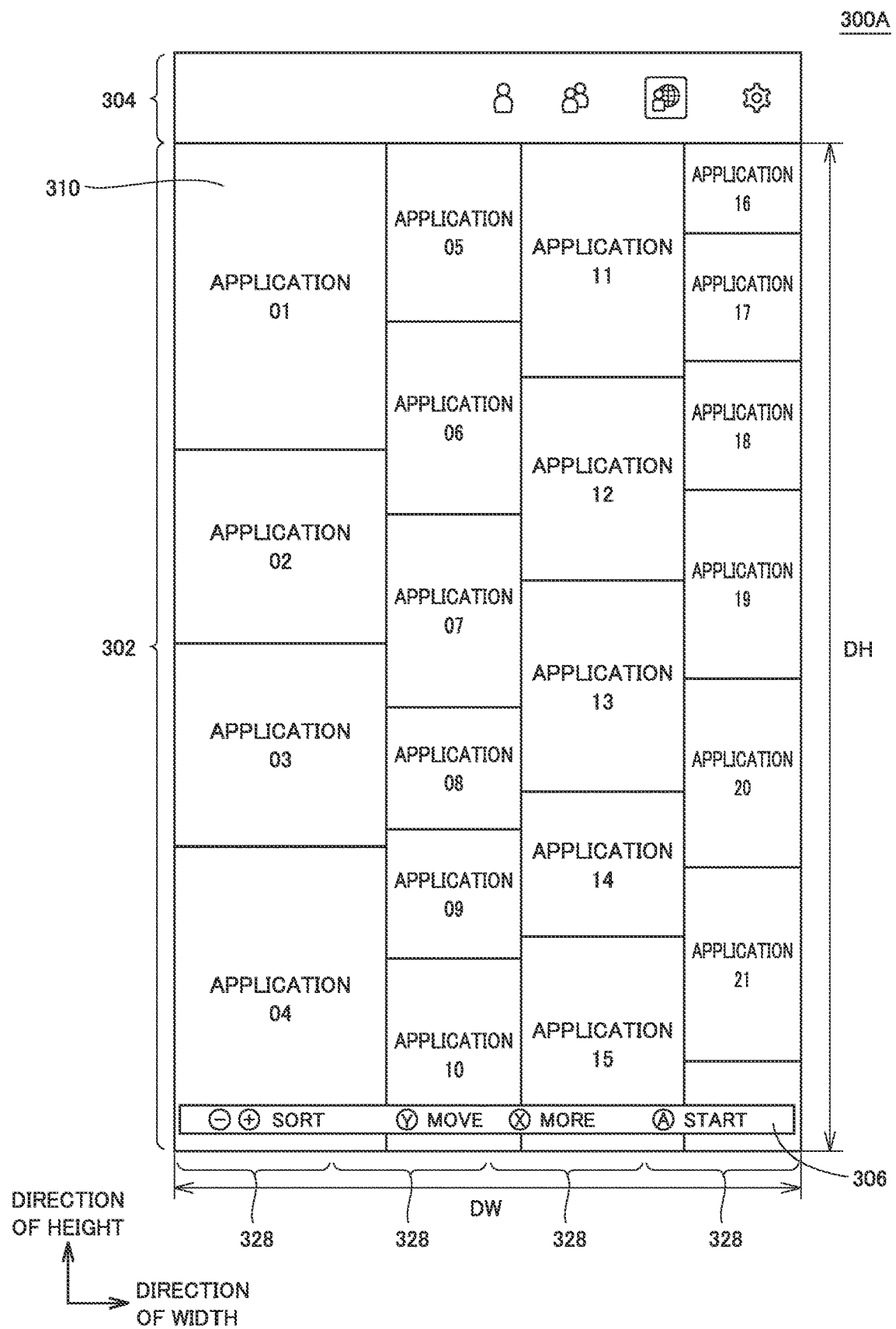
FIG. 22 shows an exemplary illustrative non-limiting drawing illustrating one example of the menu image provided by the information processing system according to a modification of the present embodiment.

Menu image 300A shown in FIG. 22 is provided as a result of processing similar to that in the embodiment described above, and similar processing is performed also in response to an operation onto the same by a user. Since the processing and functions are substantially the same as those in the description above with a feature described as the "row" being read as the "column", detailed description will not be repeated.

[H. Advantage]

In the menu image according to the present embodiment, a user can arrange his/her preferred icon which graphically expresses each application (typically a game application) at his/her preferred position. As the user simply arranges an icon at his/her preferred position, arrangement of remaining icons is also changed and a display size thereof is also adjusted. Therefore, a layout of icons in the menu image is not disordered.

In the menu image according to the present embodiment, a display size of each icon is adjusted in each row. Therefore, each icon can be shown in a large size by arranging a small number of icons in one row, or to the contrary, many applications can be viewed at once by arranging a large number of icons in one row. Therefore, the embodiment is suitable for a menu image provided in such a configuration that a large number of applications are provided to an information processing system. A specific application can be shown in a large size so as to stand out among a large number of applications, and a large number of applications can also simultaneously be shown with small icons.

When an application is a game program sold in the past, in particular, each user is highly interested in a specific game program based on his/her past play experiences. Since the specific game program may desirably be emphasized in such a case, the menu image provided by the information processing system according to the present embodiment is suitable.

In the information processing system according to the present embodiment, layout information is adopted for realizing a menu image, and data management in connection with a menu image can be simplified.

In the information processing system according to the present embodiment, icon images for showing icons do not have to be identical in size so long as the size is not greater than a predetermined maximum size. Therefore, an operation for generating an icon image can be simplified. For example, when an icon image is generated by scanning, an appropriate layout can be realized in a menu image even though image sizes resulting from scanning are varied.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A non-transitory computer-readable storage medium with an executable program stored thereon, the program, when executed by a processor of an information processing apparatus, causing the processor to perform the steps comprising:
    setting an order of arrangement of a plurality of icon images for each row, of a plurality of rows, in a menu region, wherein the plurality of icon images include icon images with different heights, wherein each of the icon images is associated with an application;
    changing arrangement of the plurality of icon images in response to an input instruction;
    determining a display size of each icon image by varying a size of each icon image, wherein a length-to-width ratio of the each icon image is maintained and an identical height is determined for the icon images with different heights in each row in the menu region and varying a size of the icon images as a whole included in the row at an identical ratio such that a width of the row as a whole is set to a prescribed length;
    generating a menu image in which each icon image is arranged in the determined display size for each row;
    moving, in response to a received instruction, a first icon image from a first row, of the plurality of rows, to a second row, of the plurality of rows, that is different from the first row;
    as a result of movement of the first icon image from the first row to the second row, dynamically resize, for the menu image that is generated, the image icons that are now in the first and second rows, wherein a length-to-width ratio of the each icon image in the first and second rows is maintained and an identical height is used across all heights of the icon images within the respective first and second rows; and
    starting, in response to an instruction onto any icon, execution of an application associated with the instructed icon.

2. The non-transitory computer-readable storage medium according to claim 1, wherein
    the changing arrangement includes processing for inserting a selected icon in any position in any row.

3. The non-transitory computer-readable storage medium according to claim 2, wherein
    the selected icon is shown with an icon image having a display size relatively greater than before selection.

4. The non-transitory computer-readable storage medium according to claim 1, wherein
    the changing arrangement includes processing for sorting the plurality of icon images under a prescribed rule.

5. The non-transitory computer-readable storage medium according to claim 1, wherein
    the application includes a game program.

6. The non-transitory computer-readable storage medium according to claim 5, wherein
    the icon image includes a package image of a game program sold in past.

7. The non-transitory computer-readable storage medium according to claim 1, wherein
    the plurality of icon images include a first icon image associated with start of a first application from a first state and a second icon image associated with start of the first application from a second state different from the first state.

8. The non-transitory computer-readable storage medium according to claim 7, wherein
    the start from the second state is realized by reading and execution by the first application of setting information which defines the second state.

9. The non-transitory computer-readable storage medium according to claim 1, wherein the steps further comprise
    outputting layout information including information on an order of the plurality of icon images and a display size of each icon image; and
    sharing the layout information with other information processing apparatuses during online play.

10. The non-transitory computer-readable storage medium according to claim 1, wherein
    the steps further comprise showing detailed information on an application associated with a selected icon in response to an input instruction.

11. The non-transitory computer-readable storage medium according to claim 1, wherein the steps further comprise showing a prescribed icon for an application satisfying a prescribed condition, rather than an icon shown with an icon image associated with the application.

12. A non-transitory computer-readable storage medium with an executable program stored thereon, the program, when executed by a processor of an information processing apparatus, causing the processor to perform the steps comprising:
setting an order of arrangement of a plurality of icon images for each column in a menu region, wherein the plurality of icon images include icon images with different heights, wherein each of the icon images is associated with an application;
changing arrangement of the plurality of icon images in response to an input instruction;
determining a display size of each icon image by varying a size of each icon image, wherein a length-to-width ratio of the each icon image is maintained and an identical height is determined for the icon images with different heights in each column in the menu region and varying a size of the icon images as a whole included in the column at an identical ratio such that a width of the column as a whole is set to a prescribed length;
generating a menu image in which each icon image is arranged in the determined display size for each column;
moving, in response to a received instruction, a first icon image from a first row, of the plurality of rows, to a second row, of the plurality of rows, that is different from the first row;
as a result of movement of the first icon image from the first row to the second row, dynamically resize, for the menu image that is generated, the image icons that are now in the first and second rows, wherein a length-to-width ratio of the each icon image in the first and second rows is maintained and an identical height is used across all heights of the icon images within the respective first and second rows; and
starting, in response to an instruction onto any icon, execution of an application associated with the instructed icon.

13. An information processing apparatus comprising:
at least one hardware processor configured to:
set an order of arrangement of a plurality of icon images for each row in a menu region, wherein the plurality of icon images include icon images with different heights, wherein each of the icon images is associated with an application;
change arrangement of the plurality of icon images in response to an input instruction;
determine a display size of each icon image by varying a size of each icon image, wherein a length-to-width ratio of the each icon image is maintained and an identical height is determined for the icon images with different heights in each row in the menu region and varying a size of the icon images as a whole included in the row at an identical ratio such that a width of the row as a whole is set to a prescribed length;
generate a menu image in which each icon image is arranged in the determined display size for each row;
move, in response to a received instruction, a first icon image from a first row, of the plurality of rows, to a second row, of the plurality of rows, that is different from the first row;
as a result of movement of the first icon image from the first row to the second row, automatically resize, for the menu image that is generated, the image icons that are now in the first and second rows, wherein a length-to-width ratio of the each icon image in the first and second rows is maintained and an identical height is used for heights of the icon images in the respective first and second rows; and
start, based on an instruction that is provided in conjunction with any icon, execution of an application associated with the instructed icon.

14. The information processing apparatus according to claim 13, wherein the at least one hardware processor is further configured to insert a selected icon in any position in any row.

15. The information processing apparatus according to claim 14, wherein
the selected icon is shown with an icon image having a display size relatively greater than before selection.

16. An information processing method comprising:
setting an order of arrangement of a plurality of icon images for each row in a menu region, wherein the plurality of icon images include icon images with different heights, wherein each of the icon images is associated with an application;
changing arrangement of the plurality of icon images in response to an input instruction;
determining a display size of each icon image by varying a size of each icon image, wherein a length-to-width ratio of the each icon image is maintained and an identical height is determined for the icon images with different heights in each row in the menu region and varying a size of the icon images as a whole included in the row at an identical ratio such that a width of the row as a whole is set to a prescribed length;
generating a menu image in which each icon image is arranged in the determined display size for each row;
moving, in response to a received instruction, a first icon image from a first row, of the plurality of rows, to a second row, of the plurality of rows, that is different from the first row;
as a result of movement of the first icon image from the first row to the second row, dynamically resize, for the menu image that is generated, the image icons that are now in the first and second rows, wherein a length-to-width ratio of the each icon image in the first and second rows is maintained and an identical height is used for heights of the icon images in the respective first and second rows; and
starting, in response to an instruction onto any icon, execution of an application associated with the instructed icon.

17. The information processing method according to claim 16, wherein
the changing arrangement includes processing for inserting a selected icon in any position in any row.

18. The information processing method according to claim 17, wherein
the selected icon is shown with an icon image having a display size relatively greater than before selection.

19. An information processing system comprising:
a display device; and
an information processing device,
the information processing device being configured to perform:
setting an order of arrangement of a plurality of icon images for each row in a menu region, wherein the plurality of icon images include icon images with different heights, wherein each of the icon images is associated with an application, changing arrangement of the plurality of icon images in response to an input instruction, determining a display size of each icon image by varying a size of each icon image with a length-to-width ratio of the each icon image, wherein a length-to-width ratio of the each icon image is maintained and an identical height is determined for the icon images with different heights in each row in the menu region and varying a size of the icon images as a whole included in the row at an identical ratio such that a width of the row as a whole is set to a prescribed length, generating a menu image in which each icon image is arranged in the determined display size for each row, moving, in response to a received instruction, a first icon image from a first row, of the plurality of rows, to a second row, of the plurality of rows, that is different from the first row, as a result of movement of the first icon image from the first row to the second row, dynamically resize, for the menu image that is generated, the image icons that are now in the first and second rows, wherein a length-to-width ratio of the each icon image in the first and second rows is maintained and an identical height is used for heights of the icon images in the respective first and second rows, and starting, in response to an instruction onto any icon, execution of an application associated with the instructed icon.

20. The information processing system according to claim 19, wherein the changing arrangement includes processing for inserting a selected icon in any position in any row.

* * * * *